US005495285A

United States Patent [19]
Fujioka

[11] Patent Number: 5,495,285
[45] Date of Patent: Feb. 27, 1996

[54] COMMUNICATION SYSTEM FOR STARTING TELECONFERENCE BETWEEN TWO MULTIMEDIA STATIONS OVER NETWORK

[75] Inventor: Susumu Fujioka, Zama, Japan

[73] Assignee: Ricoh Company, Ltd., Tokyo, Japan

[21] Appl. No.: 250,520

[22] Filed: May 26, 1994

[30] Foreign Application Priority Data

| May 27, 1993 | [JP] | Japan | 5-151138 |
| Jun. 25, 1993 | [JP] | Japan | 5-177612 |
| Apr. 14, 1994 | [JP] | Japan | 6-101828 |

[51] Int. Cl.[6] .................................................. H04M 11/00
[52] U.S. Cl. ........................... 348/15; 379/96; 379/202; 370/85.6
[58] Field of Search .................. 348/14–16; 379/93, 379/94, 96–98, 201–207; 370/18, 85.3, 85.6, 54

[56] References Cited

U.S. PATENT DOCUMENTS

| 5,365,265 | 11/1994 | Shibata et al. | 348/15 |
| 5,373,503 | 12/1994 | Chen | 370/18 |
| 5,408,261 | 4/1995 | Kamata et al. | 348/15 |
| 5,444,477 | 8/1995 | Yamadera et al. | 348/15 |

*Primary Examiner*—Wing F. Chan
*Attorney, Agent, or Firm*—Popham, Haik, Schnobrich & Kaufman, Ltd.

[57] ABSTRACT

A communication system includes: a source multimedia station; a destination multimedia station; a first unit for generating a first random number in response to a connection start request, for transmitting the first random number to the destination multimedia station, and for receiving a second random number from the destination multimedia station; a second unit for generating a second random number in response to a connection start request, for transmitting the second random number to the source multimedia station, and for receiving the first random number from the source multimedia station; a control unit for establishing a telewriting connection between the two stations over a network by performing a telewriting connection protocol in response to a telewriting connection request issued from one of the two stations; and a unit for allowing the one of the two stations to issue a telewriting connection request to the other station, based on the result of comparison between the first random number and the second random number, and for inhibiting the other station from issuing a telewriting connection request, based on the result of the comparison.

16 Claims, 29 Drawing Sheets

FIG. 7

| APPLICATION PROGRAM | TW PROTOCOL RUNNING PART (SPECIAL MODE) | CESSION PROTOCOL RUNNING PART (CCITT X, 225) | TRANSPORT PROTOCOL RUNNING PART (CCITT X, 224) | NETWORK PROTOCOL RUNNING PART (CCITT T, 70 NL) | DATA LINK PROTOCOL RUNNING PART (SPECIAL MODE) |
|---|---|---|---|---|---|

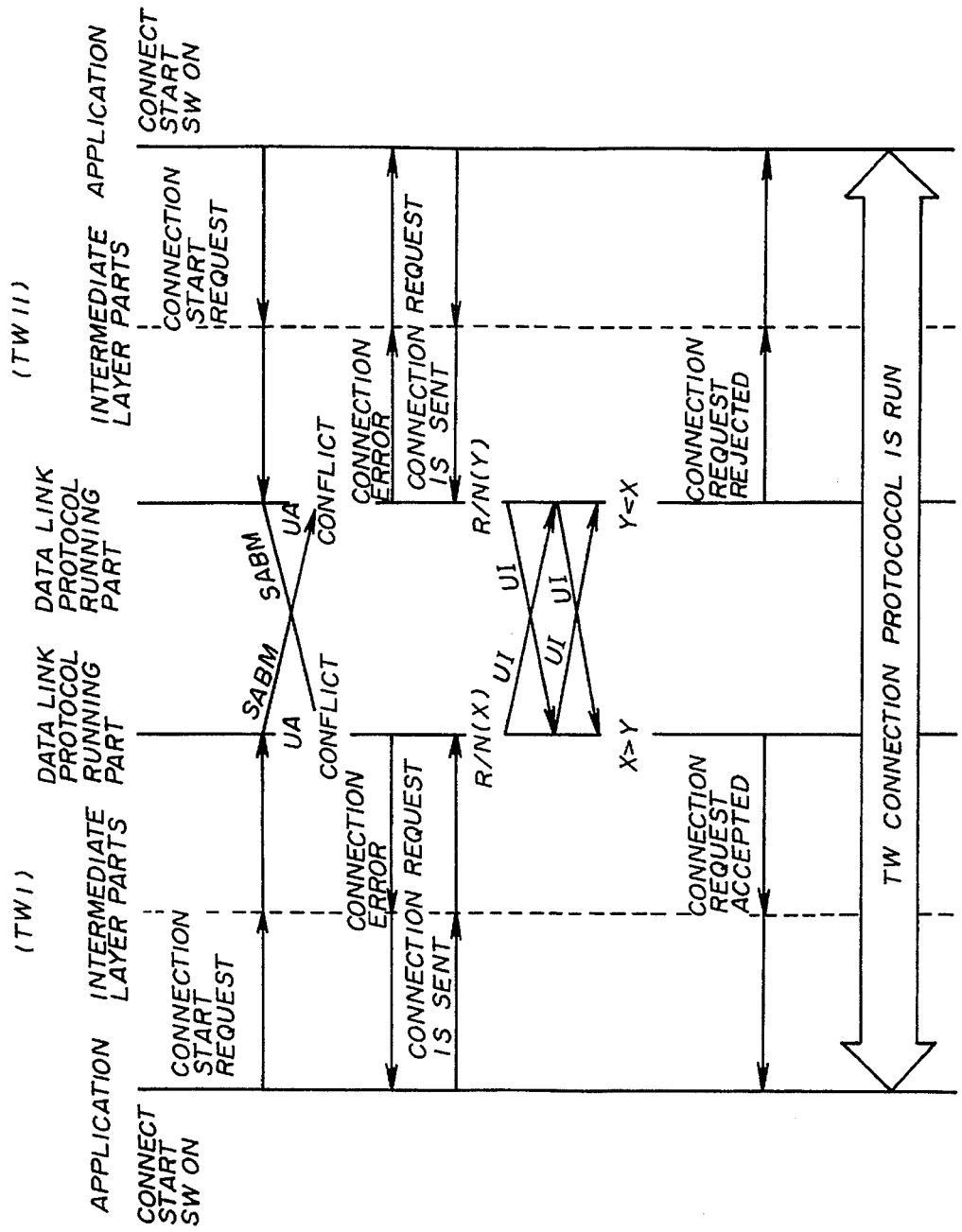

COMMUNICATION SYSTEM FOR STARTING TELECONFERENCE BETWEEN TWO MULTIMEDIA STATIONS OVER NETWORK

BACKGROUND OF THE INVENTION

The present invention generally relates to a communication system, and more particularly to a communication system for efficiently starting a teleconference between two multimedia stations over a network.

CCITT has recommended various standards of multimedia communication equipment and various standards of data transmission protocols for transmitting data over an ISDN (Integrated Services Digital Network).

FIG.1 shows a model of data transmission protocols used by a multimedia communication system to carry out a teleconference between two multimedia stations over an ISDN. The ISDN which is a communication path between the two multimedia stations is composed of a D channel (a signal channel) and a plurality of B channels (information channels). The layer-1 in the reference model of OSI (Open Systems Interconnection) for each channel is constructed in conformity with the CCITT 1.430 standard.

The D channel is used to perform a transport connection between the two multimedia stations after the processing of the layer-2 and the layer-3 in the reference mode of OSI is performed. The audio signal, the video signal, the MLP (Multi-Layer Protocol) signal and the BAS (Bit rate Allocation Signal) are multiplexed and the multiplexed signal is transmitted over ISDN by using the B channels in conformity with the CCITT H.221 standard.

The audio signal indicates the voice during a teleconference between two multimedia stations, and the video signal indicates an image produced by a video camera during a video conference between the stations. The MLP includes a CI (control and indication) signal and a TW (telewriting) signal,, The CI signal is used to start and stop a transmission control procedure for TW transmission. The TW signal indicates the control of a manually-input drawing and the control of displayed screen data. In accordance with the CCITT X.225, X.224 and Q.922 standards, the CI signal and the TW signal are included in the MLP signal, and the MLP signal, including the CI signal and the TW signal, is transmitted over ISDN. The BAS indicates an equipment capability list and control commands, and the BAS signal is transmitted through a procedure in conformity with the CCITT H.242 standard.

FIG.2 shows transmission control procedures performed when a teleconference between two multimedia stations over an ISDN is started. As shown in FIG.2, a start request for transmission is issued by an operator on a source station by setting the identification code of a destination station and sending a transmission start command to the destination station.

After the destination station is called from the source station, a first channel connection protocol between the two stations is run to acquire a B channel of the ISDN. The B channel, after it is acquired, enables the transmission of an audio signal from one station to the other and vice versa, so that the operators at the two stations can talk with each other.

After the two stations have received an equipment capability list from the other station, a second channel connection protocol between the two stations is run to acquire another B channel. After the two B channels are acquired, the AUDIO+VIDEO mode is set so that the audio signal and the video signal can be transmitted through the two B channels. The operators at the two stations can talk with each other and can view an image produced by a video camera of the other station.

In order to start a telewriting (TW) communication between the two stations after the AUDIO+ VIDEO mode is set, it is necessary for at least one of the source station and the destination station to issue a TW connection start command to the other station. In FIG.2, the operator on the source station issues a TW connection start command to the destination station, so that the mode of each of the two stations is changed to an AUDIO+VIDEO+MLP mode.

After the AUDIO+VIDEO+MLP mode is set for the two stations, the source station sends a CI connection request to the destination station over the network. A CI connection protocol between the two stations is run, so that a CI connection between the two stations is thus established.

After the CI connection is established, the source station sends a TW connection start request to the destination station over the network. After a response from the destination station is received, the source station sends a TW connection request to the destination station over the network. A TW connection protocol between the two stations is run, so that a TW connection between the two stations is thus established. The MLP transmitting channel acquired by the TW connection enables the starting of a TW communication between the two stations over the ISDN.

After the TW connection is established, if one of the operators on the two stations manually inputs a drawing, the manually-input drawing is transmitted from one station to the other station over the network. For example, the operator on the destination station can view the drawing supplied from the source station on a display monitor on the destination station. Also, if the operator on the source station performs a page break on a display monitor on the source station, the display control data is transmitting to the destination station over the network. The display monitor on the destination station is subjected to a page break in synchronism with the page break of the display monitor on the source station. In this manner, a TW communication between the two stations over the ISDN is carried out.

In order to end the TW communication between the two stations, it is necessary for at least one of the two stations to issue a TW disconnection request command to the other station. In FIG.2, the operator on the source station issues a TW disconnection request to the destination station. After a response from the destination station is received, the source station sends a TW release request to the destination station. A TW connection releasing protocol between the two stations is run, so that the TW connection between the two stations is released. The source station further sends a CI release request to the destination station. A CI connection releasing protocol between the two stations is run, so that the CI connection between the two stations is released. Then, the teleconference between the two stations over the ISDN ends. A given disconnection procedure between the two stations is later performed, and the first and second channel connections between them are also released.

Two methods for setting the abilities of the stations to issue the teleconference start request are conceivable: only one of the two stations is allowed to issue a teleconference start request; or both the two stations are allowed to issue teleconference start requests. If only one of the two stations is allowed to issue a teleconference start request, the non-allowed station cannot issue a teleconference start request at all times.

On the other hand, if both the two stations are allowed to issue the teleconference start requests, there is a problem in that the two stations may issue the teleconference start request to each other at the same time. In such a case, an MLP connection between the two stations fails due to the simultaneously issued requests of the two stations. FIG.3 shows a portion of the transmission control procedures when the two stations have issued the teleconference start request to each other at the same time.

In FIG.3, after the AUDIO+VIDEO+MLP mode is set, the source station issues a CI connection request to the destination station, and, at the same time, the destination station issues a CI connection request to the source station. The CI connection request is transmitted from one station to the other station over the network in conformity with of the procedure of the CCITT X.225 standard. Since the case in which the two stations have issued the teleconference start requests at the same time is not taken into consideration by the CCITT X.225 standard, a connection error occurs in the above case. The transmission control procedure is thus stopped, and the CI connection fails.

In order to start running the CI connection protocol between the two stations after a connection error is detected, it is necessary for the operator on one of the two stations to re-issue a teleconference start request and then send a CI connection request to the other station. If the two stations have again issued the teleconference start request to each other at the same time, the operator on the above station has to repeat the same operations as he previously performed.

Therefore, if both the two stations are allowed to issue the teleconference start request, the two stations may issue the teleconference start request to each other at the same time. The two connection requests, simultaneously issued from the two stations, conflict with each other, causing a connection error to occur. It is necessary for the operator on one of the two stations to perform a teleconference starting operation again whenever a connection error is detected. This is considerably inconvenient to the operators on the two stations.

SUMMARY OF THE INVENTION

Accordingly, it is a general object of the present invention to provide an improved teleconference communication system in which the above described problems are eliminated.

Another, more specific object of the present invention is to provide a communication system which efficiently starts a teleconference between two multimedia stations over a network without causing a connection error even when the two stations issue connection requests to each other at the same time.

Still another object of the present invention is to provide a communication system in which a telewriting connection between two multimedia stations over a network can be automatically established after a teleconference start request is issued.

The above mentioned objects of the present invention are achieved by a communication system which includes: a source multimedia station; a destination multimedia station; a first unit, provided within the source multimedia station, for generating a first random number in response to a connection start request, for transmitting the first random number to the destination multimedia station, and for receiving a second random number from the destination multimedia station after the first random number is transmitted; a second unit, provided within the destination multimedia station, for generating a second random number in response to a connection start request, for transmitting the second random number to the source multimedia station, and for receiving the first random number from the source multimedia station after the second random number is transmitted; a control unit for establishing a telewriting connection between the two stations over a network by performing a telewriting connection protocol in response to a telewriting connection request issued from one of the two stations; and a unit for allowing the one of the two stations to issue a telewriting connection request to the other station, based on the result of comparison between the first random number and the second random number, and for inhibiting the other station from issuing a telewriting connection request, based on the result of the comparison.

According to the present invention, it is possible to efficiently start a teleconference between two stations without causing a connection error even when the connection start requests are issued from the two stations at the same time. It is possible to prevent the occurrence of a connection error due to the conflict between the connection start requests issued from the two stations at the same time.

BRIEF DESCRIPTION OF THE DRAWINGS

The above and other objects, features and advantages of the present invention will be more apparent from the following detailed description when read in conjunction with the accompanying drawings in which:

FIG.7 is a diagram showing the specification of communication protocols used by a telewriting unit;

FIG.20 is a diagram showing transmission control procedures in the fifth embodiment;

DESCRIPTION OF THE PREFERRED EMBODIMENTS

A description will now be given, with reference to FIGS.4 through 9, of a communication system to which the present invention is applied.

Figure 4:
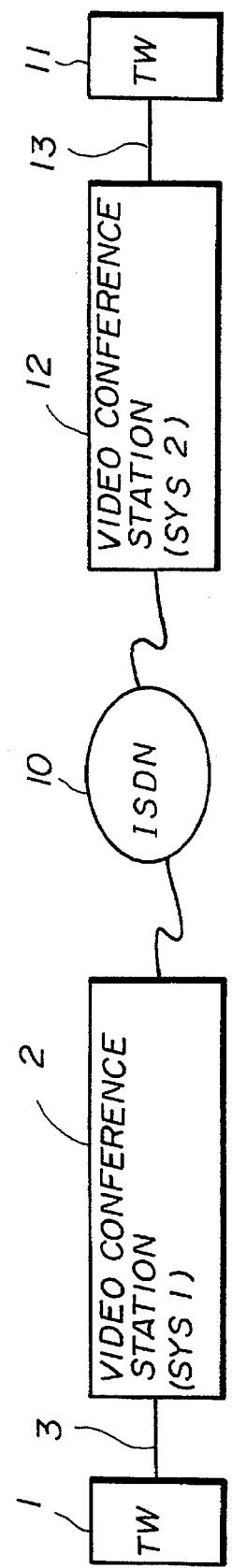
FIG.4 is a diagram showing a communication system in which a video conference between two stations with telewriting terminals over ISDN is performed.

FIG.4 shows a communication system in which a video conference between two telewriting terminals over ISDN is performed. In FIG.4, a video conference station (SYS1) 2 is connected to a video conference station (SYS2) 12 via an ISDN line 10. The video conference stations 2 and 12 are of the same structure and carry out a communication over ISDN through a procedure in conformity with the CCITT H.221 standard. A telewriting (TW) terminal 1 is connected to the video conference station 1 via an RS-232C cable 3, and a telewriting (TW) terminal 11 is connected to the video conference station 12 via an RS-232C cable 13. The telewriting terminals 1 and 11 are of the same structure and carry out a telewriting communication over the ISDN line 10.

Figure 5:
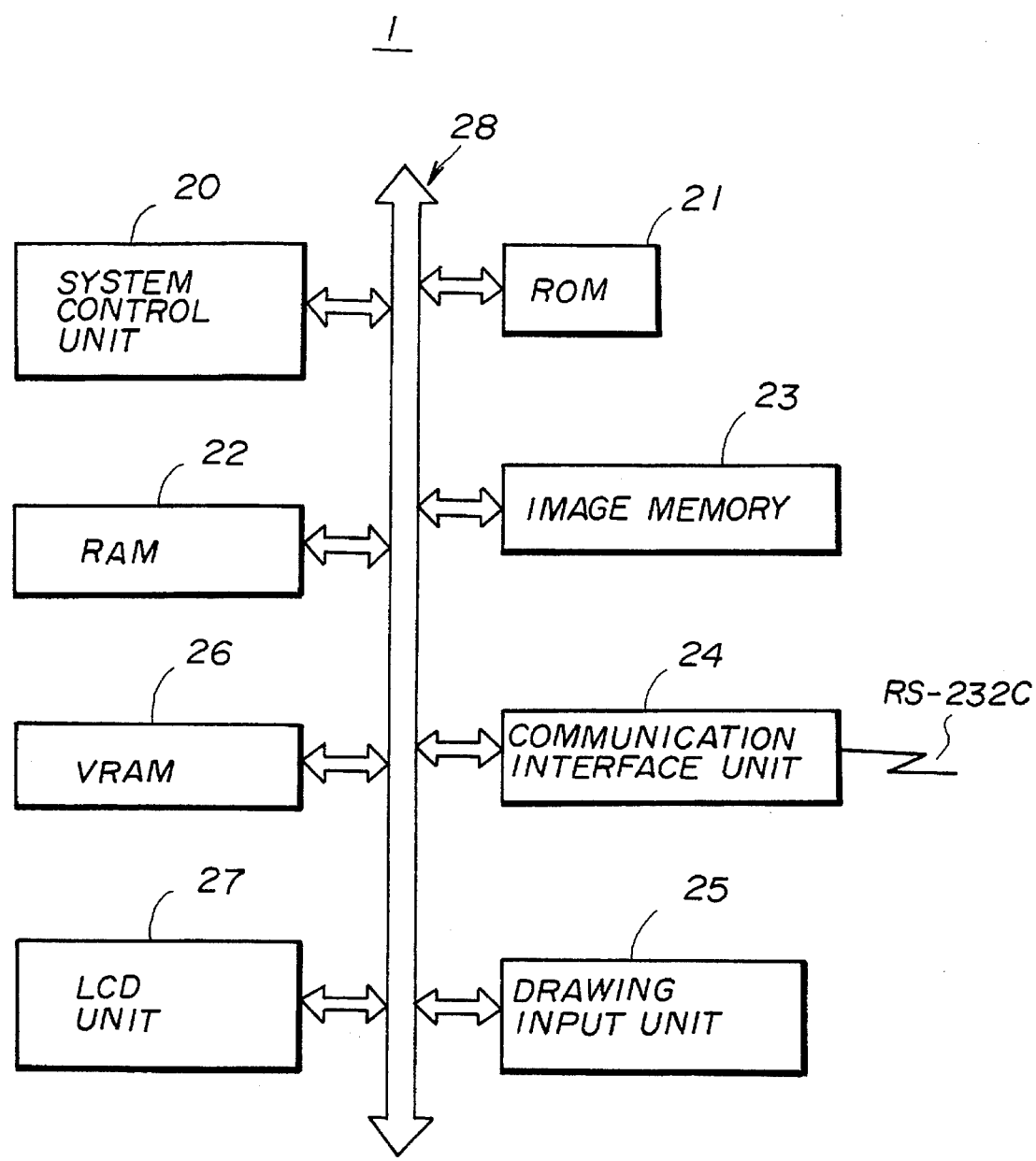
FIG.5 is a block diagram showing a telewriting terminal of the communication system in FIG.4.

FIG.5 shows a telewriting terminal of the communication system in FIG.5. In FIG.5, the telewriting terminal 1 comprises a system control unit 20 for controlling operation of the telewriting terminal 1, a ROM (read only memory) 21 for storing an application program and other control parameters, a RAM (random access memory) 22 for storing various pieces of processing data, an image memory 23, a communication interface unit 24, a drawing input unit 25, a VRAM (video RAM) 26, a LCD (liquid crystal device) display 27, and a system bus 28 for interconnecting the eight units mentioned above.

The communication interface unit 24 includes an RS-232C interface circuit and has the function to carry out a byte synchronous mode communication. The drawing input unit 25 includes a touch panel (not shown) and a contact-point detecting circuit (not shown). The position of the touch panel, which position is indicated by a special touch pen (not shown) brought into contact with the touch panel, is detected by the contact-point detecting circuit, and the detected position data is input to the drawing input unit 25. The touch panel includes a drawing input area and various button areas such as function buttons and switches. When one of the button areas of the touch panel is touched by the touch pen, a function assigned to that button area is selectively carried out. The image memory 23 is a storage unit, such as a hard disk, in which drawing data is stored in the form of files.

The LCD display 27 includes a liquid crystal device screen and an LCD screen control part. The video data is displayed on the LCD screen, and the enlargement and reduction of the displayed video data as well as the multi-window processing of the LCD display is carried out by the LCD screen control part. The video data displayed on the LCD display 27 is stored in the VRAM 26. The touch panel of the drawing input unit 25 is arranged in the LCD screen of the LCD display 27.

Figure 6:
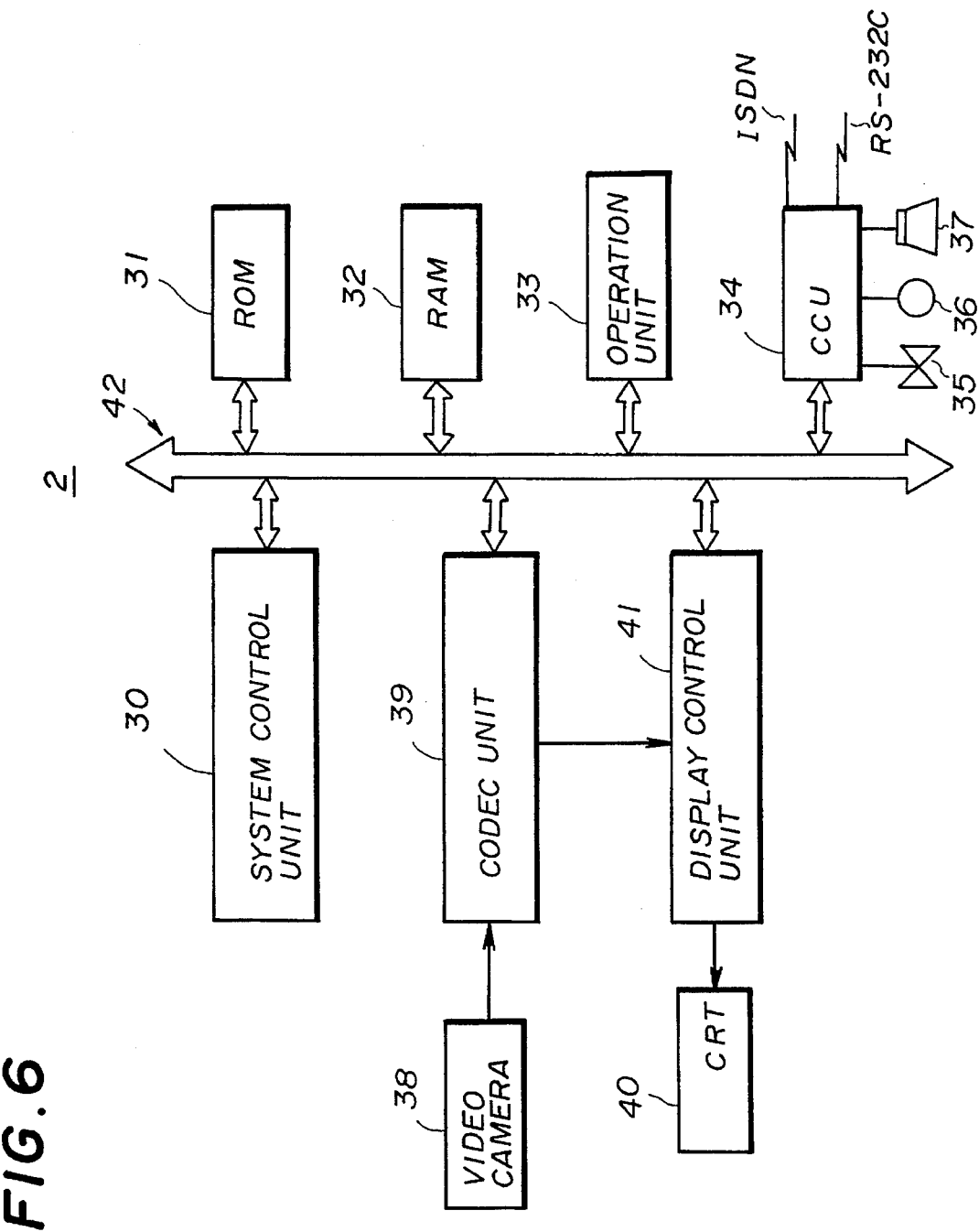
FIG.6 is a block diagram showing a video conference station of the communication system in FIG.4.

FIG.6 shows a video conference station of the communication system in FIG.4. In FIG.6, the video conference station 2 comprises a system control unit 30 for controlling operation of the video conference station 2, a ROM 31 for storing an application program and other control parameters, a RAM 32 for storing various pieces of processing data, an operation unit 33, a CCU (communication control unit) 34, a video camera 38, a CODEC (coder and decoder) unit 39, a CRT (cathode ray tube) display 40, a display control unit 41, and a system bus 42 for interconnecting the seven units mentioned above (which are the system control unit 30, the ROM 31, the RAM 32, the operation unit 33, the CCU 34, the CODEC unit 39 and the display control unit 41).

In the video conference station 2 in FIG.6, a receiver/transmitter 35, a microphone 36 and a speaker 37 are connected to the CCU 34. The CCU 34 includes an ISDN interface circuit (not shown) and an RS-232C interface circuit (not shown). The ISDN interface circuit of the CCU 34 is connected to the ISDN line in FIG.4. The RS-232C interface circuit of the CCU 34 is connected to the TW 1 through the RS-232C cable 3. The CCU 34 includes an audio signal CODEC for performing analog-to-digital conversion of audio signals, and a multiplexer/demultiplexer for processing data in conformity with the CCITT H.221 standard. The CCU 34 carries out a communication through a procedure in conformity with the CCITT H.242 standard.

The video camera 38 outputs a NTSC (National Television System Committee) signal in accordance with input video data. The CODEC unit 39 converts the NTSC signal from the video camera 38 into a CIF (Common Intermediate Format) signal, and encodes the CIF signal through a procedure in conformity with the CCITT H.261 standard. The CODEC unit 39 supplies the encoded signal to the CCU 34 via the system bus 42. On the other hand, the CODEC unit 39 decodes the encoded signal, supplied from the CCU 34 via the system bus 42, into the original CIF signal through a procedure in conformity with the CCITT H.261 standard. The CODEC unit 39 converts the CIF signal into the NTSC signal, and further converts the NTSC signal into an analog signal. The CODEC unit 39 supplies the analog signal to the display control unit 41.

The display control unit 41 enables the image information according to the analog signal from the CODEC unit 39 to be displayed on the CRT monitor 40. The display control unit 41 carries out the multi-window processing of the CRT monitor 40. The CRT monitor 40 includes an NTSC signal terminal, and displays an image in accordance with a control signal from the display control unit 41. The operation unit 33 includes a set of ten numeric keys and other keys. An operator at the video conference station 2 can input a telephone number of a destination station from the operation unit 33. Also, from the operation unit 33, a command to control the multi-window processing of the CRT monitor 40, a command to control the zoom operation of the video camera 38, and a command to select one of available media can be input by the operator.

FIG.7 shows the configuration of running parts for running the communication protocols used by a telewriting terminal of the communication system in FIG.4. The communication protocol running parts in FIG.7 are applied to each of the telewriting terminal 1 and the telewriting terminal 11 in the communication system in FIG.4 to carry out a telewriting communication between the two terminals 1 and 11. In FIG.7, the communication protocol running parts include an application program, a TW protocol running part for performing a TW connection procedure, a session protocol running part for performing a session protocol procedure in conformity with the CCITT X.225 standard, a transport protocol running part for performing a transport connection protocol procedure in conformity with the CCITT X.224 standard, a network protocol running part for performing a network connection protocol procedure in conformity with the CCITT T.70NL standard, and a data link protocol running part for performing a data link procedure. In the data link protocol running part, a byte synchronous mode communication is performed, instead of a bit synchronous mode communication, and the command, the response type and the signal sequence control are transmitted and received in the data field in accordance with the HDLC (High Level Data Link Control) procedure.

Before a telewriting communication between the telewriting terminals 1 and 11 over ISDN is performed, it is necessary that the video conference stations 2 and 12 have transmitted a BAS (Bit Rate Allocation Signal) command to each other, and that the video conference stations 2 and 12 have received the BAS command from each other. The BAS commands, transmitted or received by the video conference stations 2 and 12, are, for example, LSD-6400 or MLP-6.4k which is defined in conformity with the CCITT H.221 standard. LSD is the abbreviation of Low Speed Data, and MLP is the abbreviation of Multi-Layer Protocol. After the video conference stations 2 and 12 have received the BAS command from each other, the TW (telewriting) data can be transferred from one of the telewriting terminals 1 and 11 to the other terminal over ISDN, and vice versa.

In order to transmit the TW data from the TW terminal 1 to the TW terminal 11 over ISDN, the TW terminal 1 transfers a TW data signal to the video conference station 2 via the RS-232C cable 3. The video conference station 2 multiplexes the TW data signal, received from the TW terminal 1, the audio signal, and the video signal, through a procedure in conformity with the CCITT H.221 standard, and transmits such a signal to the video conference station 12 through the ISDN line 10. In accordance with the procedure in conformity with the CCITT H.221 standard, the video conference station 12 demultiplexes the signal from the video conference station 2 into three data signals: the TW data signal, the audio signal, and the video signal. The video conference station 12 transfers the TW data signal to the TW terminal 11 via the RS-232C cable 13. The TW data signal is transmitted from the TW terminal 1 to the TW terminal 11 over the ISDN, and vice versa.

The byte synchronous mode communication is performed for the telewriting communication between the TW terminals 1 and 11 over ISDN. The video conference stations 2 and 12 do not deal with the TW data signal sent or received between the TW terminals 1 and 11. The byte synchronous mode communication between the two TW terminals is started after the TW terminals have received synchronous patterns from each other.

Figure 8:
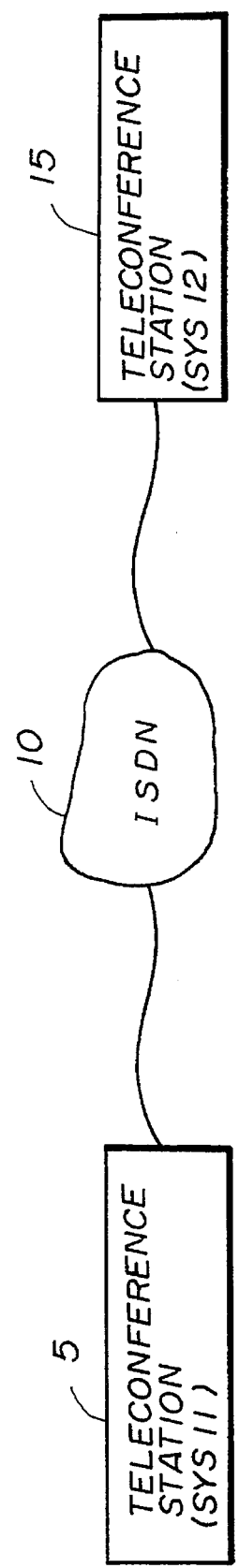
FIG.8 is a diagram showing another communication system in which a teleconference between two teleconference stations is performed.

FIG.8 shows another communication system to which the present invention is applied. In this communication system, a teleconference between two teleconference stations over ISDN is performed. In FIG.8, a teleconference station (SYS11) 5 is connected to a teleconference station (SYS12) 15 via the ISDN line 10. The teleconference stations 5 and 15 are of the same structure and carry out a teleconference communication with each other over ISDN.

Figure 9:
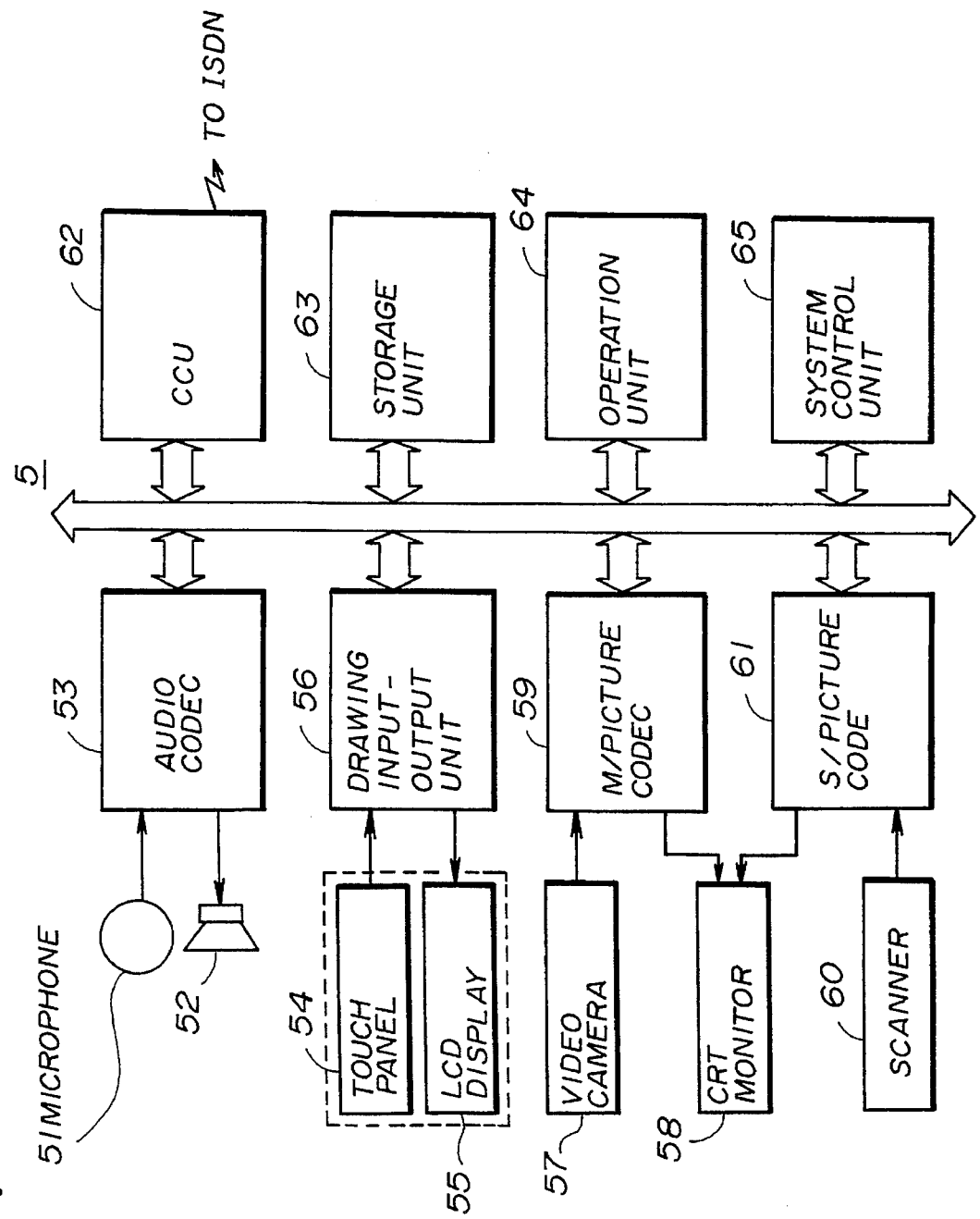
FIG.9 is a block diagram showing a teleconference station of the communication system in FIG.8.

FIG.9 shows a teleconference terminal of the communication system in FIG.8. In FIG.8, the teleconference terminal 5 comprises a microphone 51, a speaker 52, an audio CODEC 53 coupled to the microphone 51 and the speaker 52, a touch panel 54, an LCD display 55, a drawing input/output unit 56 coupled to the touch panel 54 and the LCD display 55, a video camera 57, a CRT monitor 58, a scanner 60, a motion-picture CODEC 59 coupled to the video camera 57 and the CRT monitor 58, a still-picture CODEC 61 coupled to the CRT monitor 58 and the scanner 60, a communication control unit (CCU) 62, a storage unit 63, an operation unit 64, and a system control unit 65. The eight units mentioned above, which are the audio CODEC 53, the drawing input/output unit 56, the motion-picture CODEC 59, the still-picture CODEC 61, the ISDN communication control unit 62, the storage unit 63, the operation unit 64 and the system control unit 65, are interconnected by a system bus.

The microphone 51 outputs an audio signal in accordance with the voice from an operator at the teleconference terminal 5. The speaker 52 outputs the voice in accordance with an input audio signal, the input audio signal being supplied from an operator at the teleconference terminal 15. The audio CODEC 53 converts the audio signal from the microphone 51 into a digital signal, and converts the digital signal, received from the teleconference terminal 15, into an audio signal.

A drawing can be manually input from the touch panel 54 during a teleconference between the two teleconference stations 5 and 15 over the ISDN line 10. The touch panel 54 includes a drawing input area and a set of button areas such as function buttons and switch buttons. When one of the button areas of the touch panel 54 is touched by a special touch pen (not shown), a function assigned to that button area is selected and the function is performed. The LCD display 55 is a display unit on which an input image or a received image is displayed. An operation menu in which various operating commands are listed is displayed on the LCD display 55. The touch panel 54 is arranged on the screen of the LCD display 55.

The drawing input/output unit 56 enables the image information according to the manually-input drawing from the touch panel 54 to be stored in the storage unit 63. The drawing input/output unit 56 enables the manually-input drawing to be displayed on the LCD display unit 55.

The video camera 57 outputs a video signal in accordance with a primary image. The CRT monitor 58 displays an image in accordance with an input video signal. The video signal is received from the teleconference terminal 15 during a teleconference. The motion-picture CODEC 59 converts the video signal from the video camera 57 into a digital signal, and encodes the digital signal into a compressed signal through a procedure in conformity with the CCITT H.261 standard. The motion-picture CODEC 59 decodes the compressed signal into a digital signal, and converts the digital signal into a video signal through the procedure in conformity with the CCITT H.261 standard. The scanner 60 reads out an image from a document and outputs an image signal in accordance with the read image. The still-picture CODEC 61 encodes an image signal from the scanner 60 into a compressed signal, and reconstructs the compressed signal into the original image signal.

The ISDN communication control unit 62 connects the teleconference station 5 to the ISDN line 10, and carries out a transmission control procedure or reception control procedure to communication with another teleconference station through the ISDN line 10. A set of pre-defined parameters is stored in the storage unit 63, and transmission data or reception data is temporarily stored in the storage unit 63. An operator at the teleconference station 5 can input an operating command from the operation unit 64 to the teleconference station 5. The system control unit 65 is a microcomputer for controlling operation of the teleconference station 5 and for monitoring an operating condition of the teleconference station 5. The microcomputer of the system control unit 65 includes a ROM for storing an application program and other control parameters, and a RAM for storing various pieces of processing data.

In the above described communication systems shown in FIGS.4 and 8, the control and indication (CI) connection between the video conference stations 2 and 12 or the CI connection between the teleconference stations 5 and 15 must be established before a teleconference between the two stations over ISDN is started. The communication system according to the present invention is intended to efficiently start the CI connection protocol between the two stations over ISDN. The communication system according to the present invention is intended to prevent the occurrence of the connection error due to the conflict between the connection requests from the two stations.

Next, a description will be given, with reference to FIGS.10 through 12, of the operation of the communication system in the first embodiment of the present invention.

In the following embodiments, after one of the two stations gives a call to the other station, a teleconference between the two stations over ISDN is started. After the operator on a calling station sets the identification of a destination station and issues a transmission start request over the ISDN, the destination station is called from the calling station.

Hereinafter, for the sake of convenience, the calling station which calls a different station is referred to as the source station, and the called station which is called from the source station is referred to as the destination station.

Figure 10:
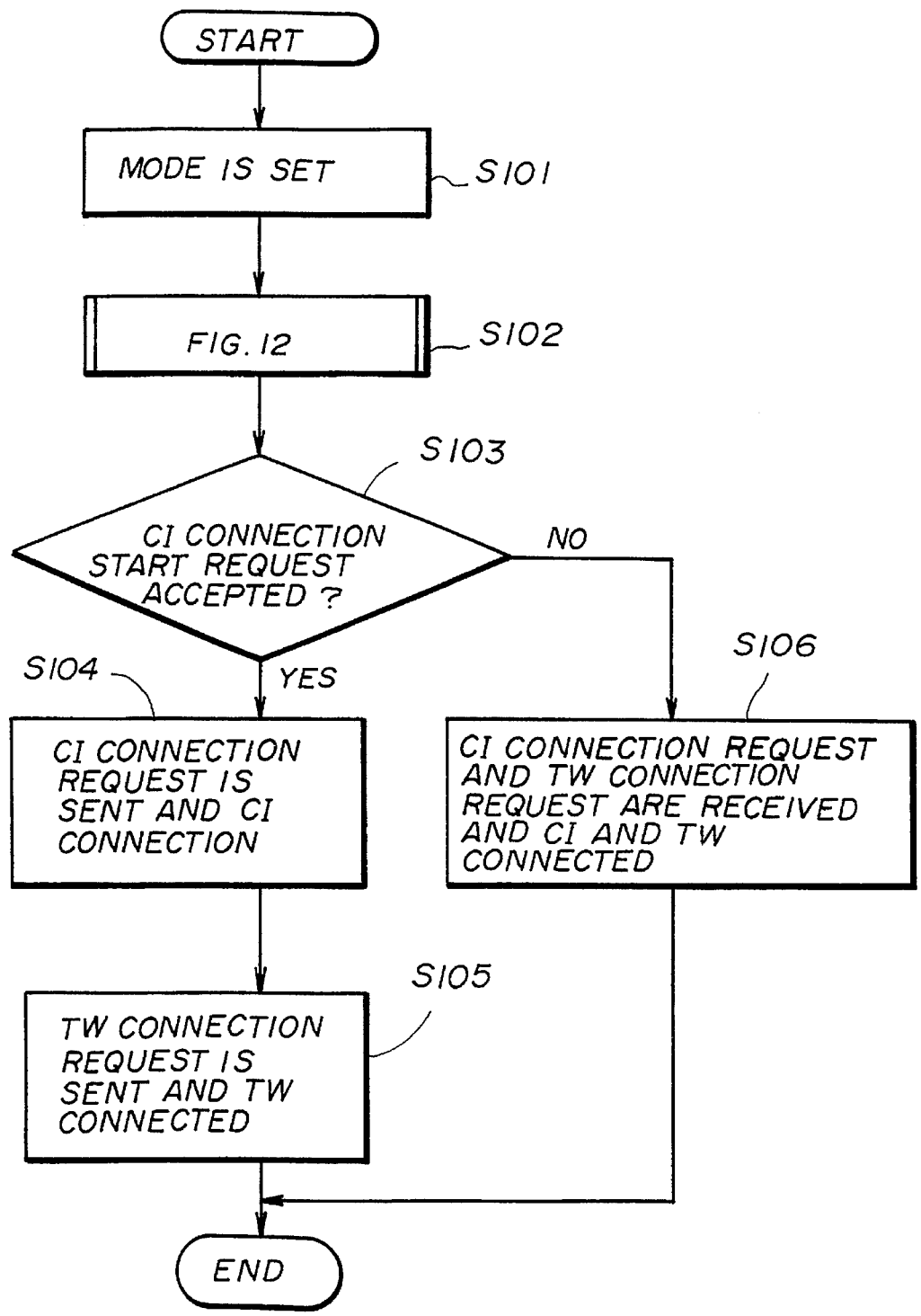
FIG.10 is a flow diagram for explaining the operation of the communication system in the first embodiment of the present invention.
Figure 11:
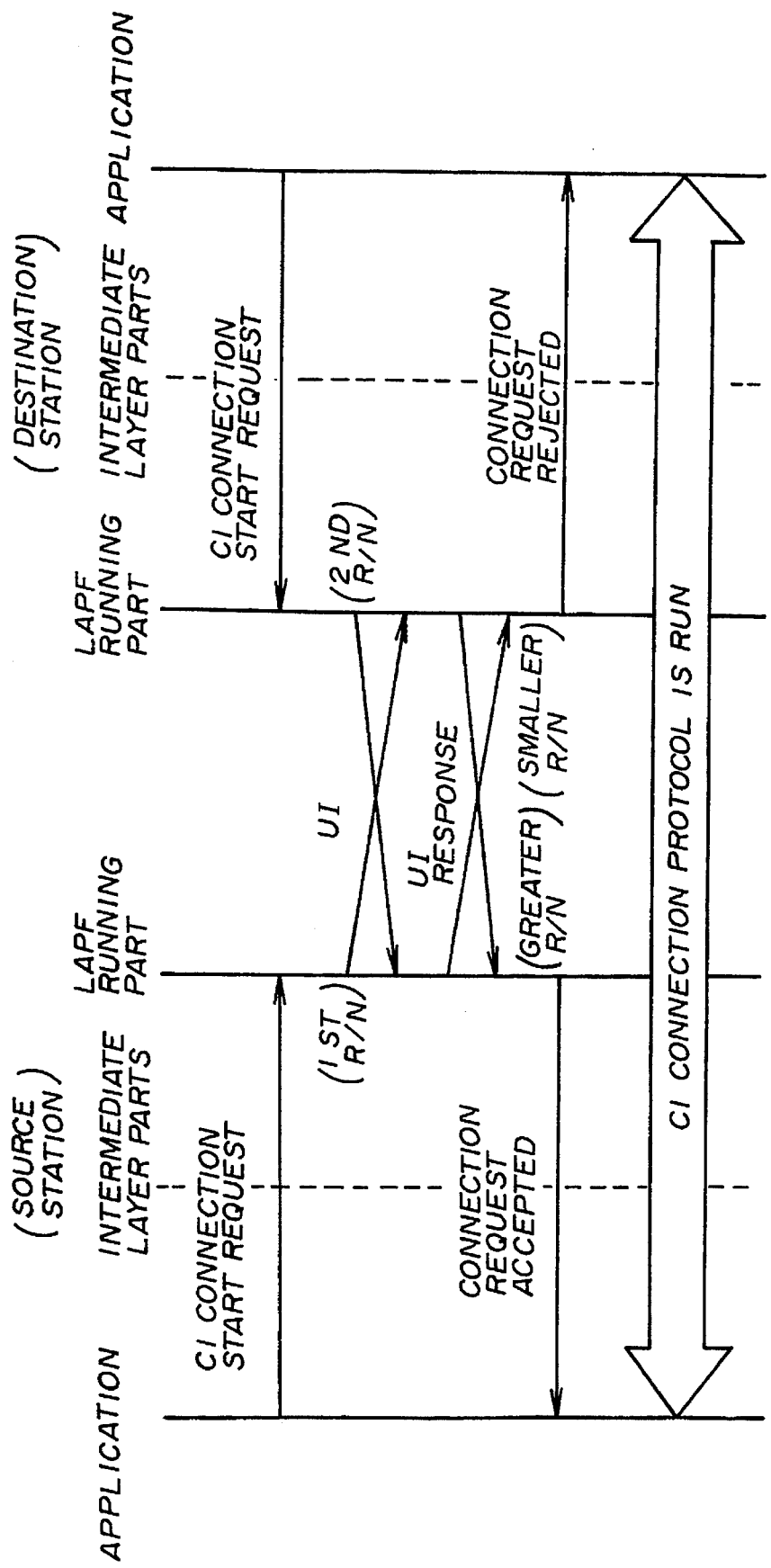
FIG.11 is a diagram showing transmission control procedures in the first embodiment.

FIG.10 shows the operation of the communication system in the first embodiment when a teleconference between the two stations over ISDN is started. The operation of the communication system is controlled by the system control unit in accordance with the application program.

Figure 1:
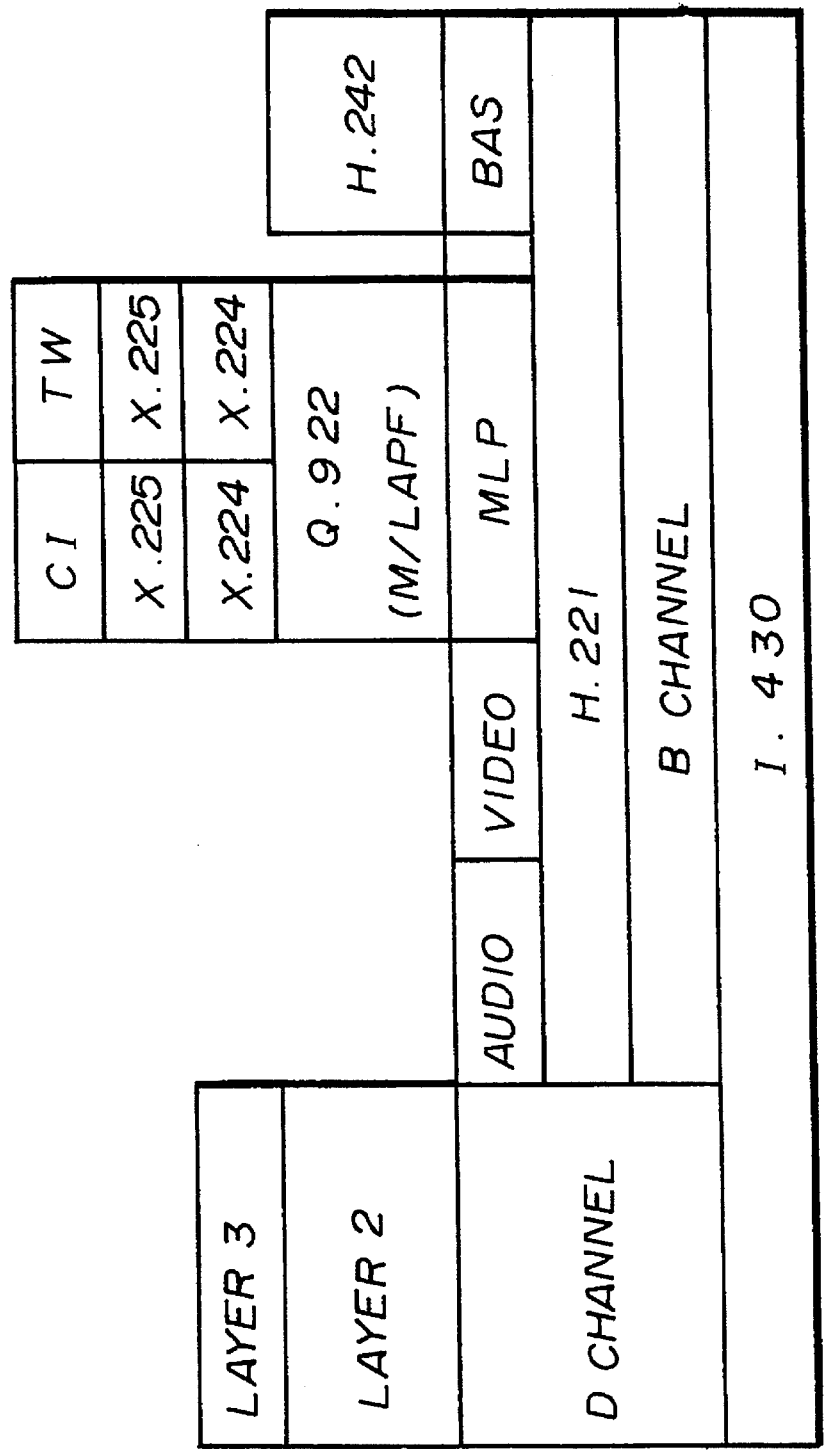
FIG.1 is a diagram showing the specification of communication protocols used by a multimedia communication system.
Figure 2:
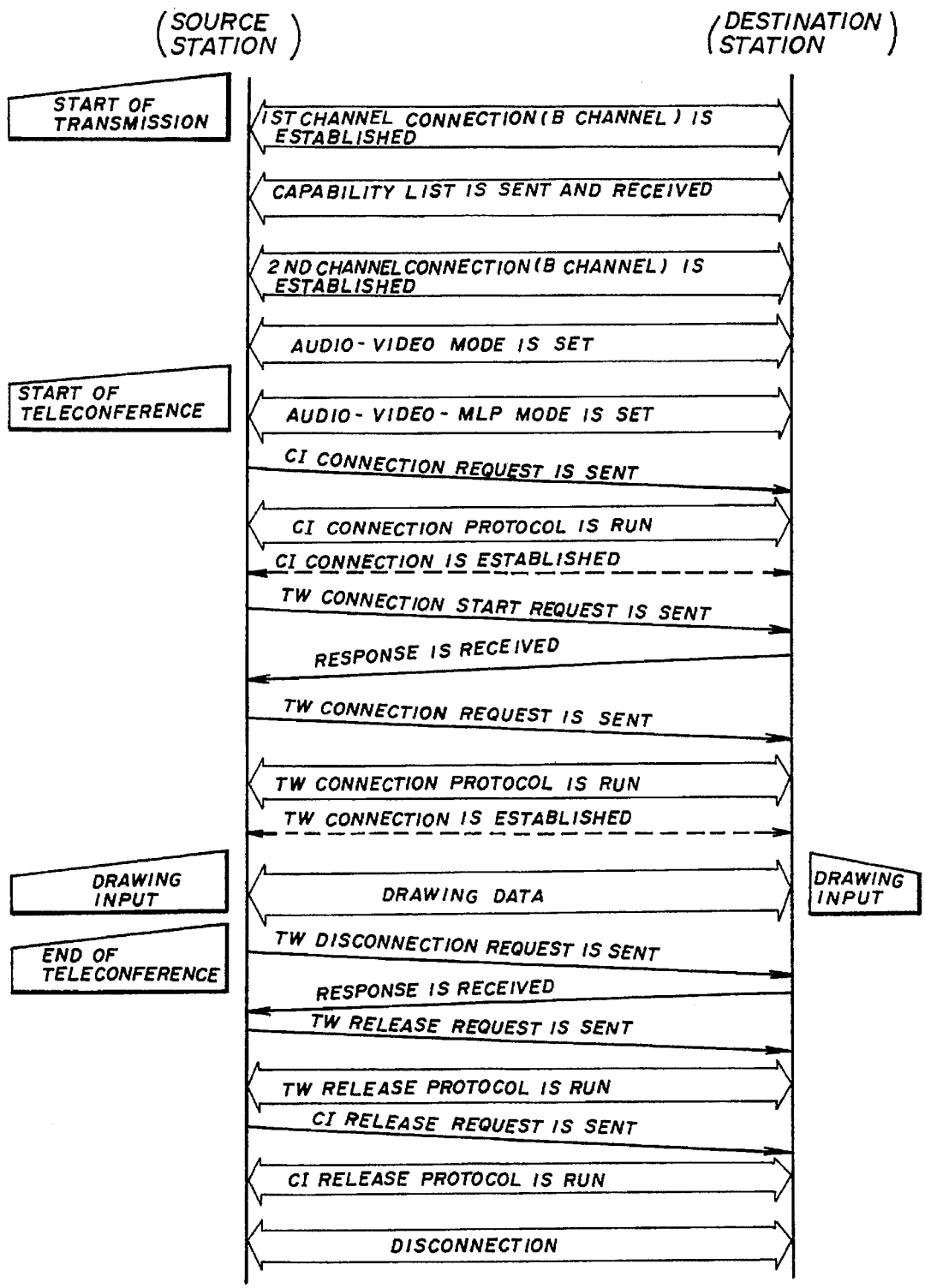
FIG.2 is a diagram showing transmission control procedures performed when a video conference is performed.
Figure 3:
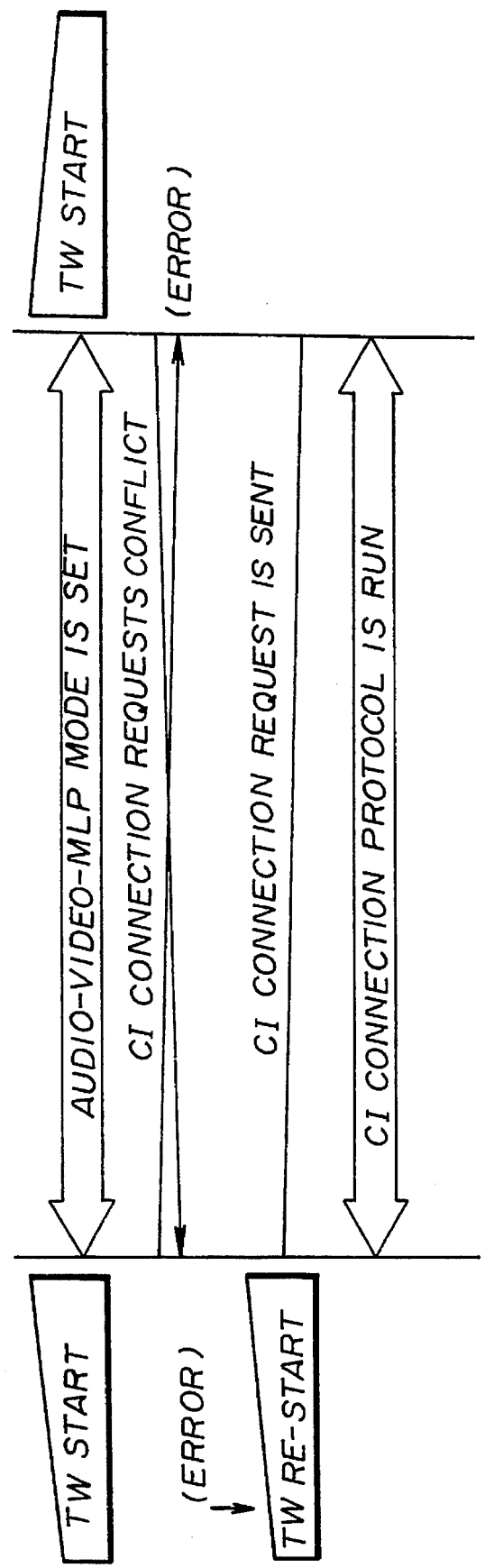
FIG.3 is a diagram showing a portion of the transmission control procedures when the two stations have issued the teleconference start request to each other at the same time.

In accordance with the transmission control procedures in FIG.2, the transport connections between the source station and the destination station over ISDN are established, and the two B channels are acquired before the teleconference between the two stations is started. In the first embodiment in FIG.10, step S1 sets the AUDIO+VIDEO+MLP mode after the transport connections between the two stations are established. This step is automatically done in accordance with the application program.

After the above step S1 is performed, step S102 performs a link access procedure shown in FIG.12, which will be described below. FIG.11 shows the transmission control procedures in the first embodiment after the AUDIO+VIDEO+MLP mode is set. In FIG.11, a CI connection start request is issued to a LAPF running part through an intermediate layer part by each of the application programs of the two stations. The LAPF running part performs an LAPF (link access procedure for FMBS) procedure in conformity with the CCITT Q.922 standard. After the CI connection start requests are received by each other, the LAPF running part of the source station performs the LAPF procedure with the LAPF running part of the destination station.

Figure 12:
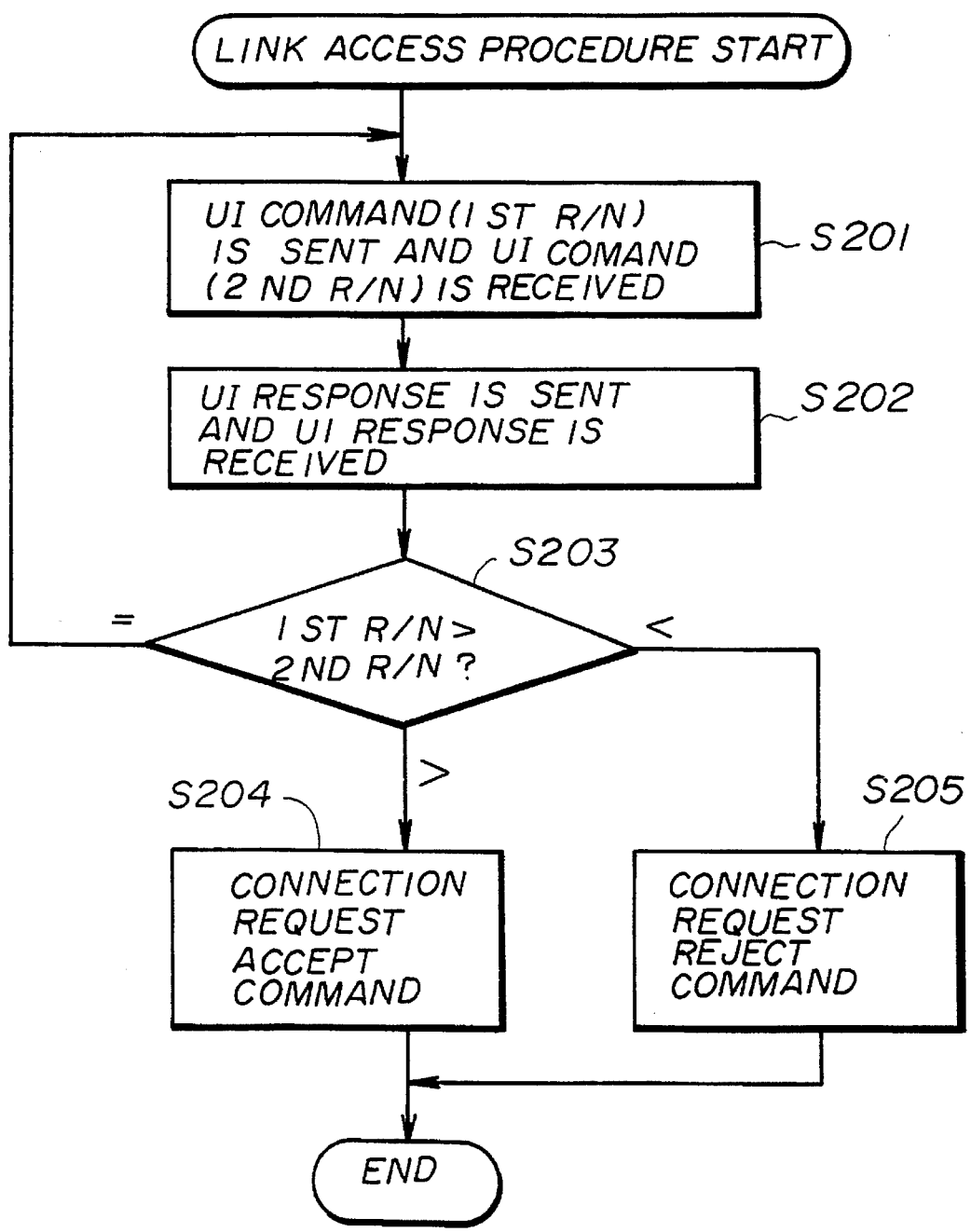
FIG.12 is a flow diagram for explaining a link access procedure in the first embodiment.

FIG.12 shows the link access procedure performed by the LAPF running parts of the two stations at step S102 in FIG.10. After the CI connection start requests are received from the application programs, each of the LAPF running parts of the two stations generates a random number by its internal process, and sets the random number to a UI (unnumbered information) command. Step S201 sends the UI command from the LAPF running part of one station to the LAPF running part of the other station, and vice versa. The LAPF running parts of the two stations thus receive the UI commands from each other.

After both the LAPF running parts have received the UI commands from each other, step S202 sends a UI response from the LAPF running part of one station to the LAPF running part of the other station, and vice versa. The LAPF running parts of the two stations receive the UI responses from each other. Thus, the LAPF running part of the source station can recognize the random number generated by itself and the random number received from the LAPF running part of the destination station. Similarly, the LAPF running part of the destination station can recognize the random number generated by itself and the random number received from the LAPF running part of the source station.

Step S203 compares a first random number generated by the LAPF running part of the station itself with a second random number received from the LAPF running part of the other station. When the first random number is detected to be greater than the second random number, the LAPF running part of the station sends a connection request accept command to the application program of the station at step S204. When the first random number is detected to be smaller than the second random number, the LAPF running part of the station sends a connection request reject command to the application program of the station at step S205.

When the above step S203 detects that the first random number is equal to the second random number, the above steps S201 through S203 are repeated until the first and second random numbers become different from each other. Thus, each of the LAPF running parts of the two stations sends either the connection request accept command or the connection request reject command to the application program. The link access procedure at step S2 in FIG.10 is thus completed.

In the operation of the communication system in the first embodiment in FIG.10, step S3 detects whether or not the CI connection start request is accepted, based on the command received from the LAPF running part after the link access procedure in FIG.12 is completed.

When the CI connection start request is accepted at step S3, step S4 sends a CI connection request from the application program of the source station to the application program of the destination station, so that the CI connection protocol between the two stations is run. Thus, the CI connection between the application programs of the two stations is established at step S4. After the CI connection is established, step S5 sends a TW connection start request from the source station to the destination station. After a response to the TW connection start request is received from the destination station, step S5 sends a TW connection request from the source station to the destination station, so that the TW connection protocol between the two stations is run. Thus, the TW connection between the two stations is established at step S5.

When the CI connection start request is rejected at step S3, step S6 awaits a CI connection request issued by the application program of the destination station, and confirms the reception of that CI connection request at the source station. After the CI connection request is received, the CI connection protocol between the application programs of the two stations is run. After the CI connection is established, step S6 receives a TW connection start request and a TW connection request, which are both issued by the other station, so that the TW connection protocol between the two stations is run. In this manner, the CI connection between the application programs of the two stations and the TW connection between the two stations are established at step S6.

Therefore, the above described first embodiment makes it possible that the operators at the teleconference stations 5 and 15 in the communication system in FIG.8 talk with each other by using the microphone 51 and the speaker 52, view the image, produced by the video camera 57 of the other station, by using the CRT monitor 58 of the station itself, and send and receive a manually-input drawing by using the touch panel 54 and the LCD display 55. A teleconference between the two teleconference stations 5 and 15 is thus realized.

In the above described first embodiment, after the AUDIO+VIDEO+MLP mode is set and the MLP channel is acquired, the source station sends the first random number, generated by itself, to the destination station and receives the second random number, generated by the destination station, by utilizing the UI command in the data link layer. When the first random number is detected to be greater than the second random number, the source station starts the establishment of the CI connection between the two stations, and starts the establishment of the TW connection between the two stations. Therefore, the present invention makes it possible to efficiently start the CI connection protocol between the two stations over ISDN. The communication system according to the present invention makes it possible to prevent the occurrence of a connection error due to the conflict between the CI connection requests from the two stations.

Next, a description will be given, with reference to FIGS.13 and 14, of the operation of the communication system in the second embodiment.

Figure 13:
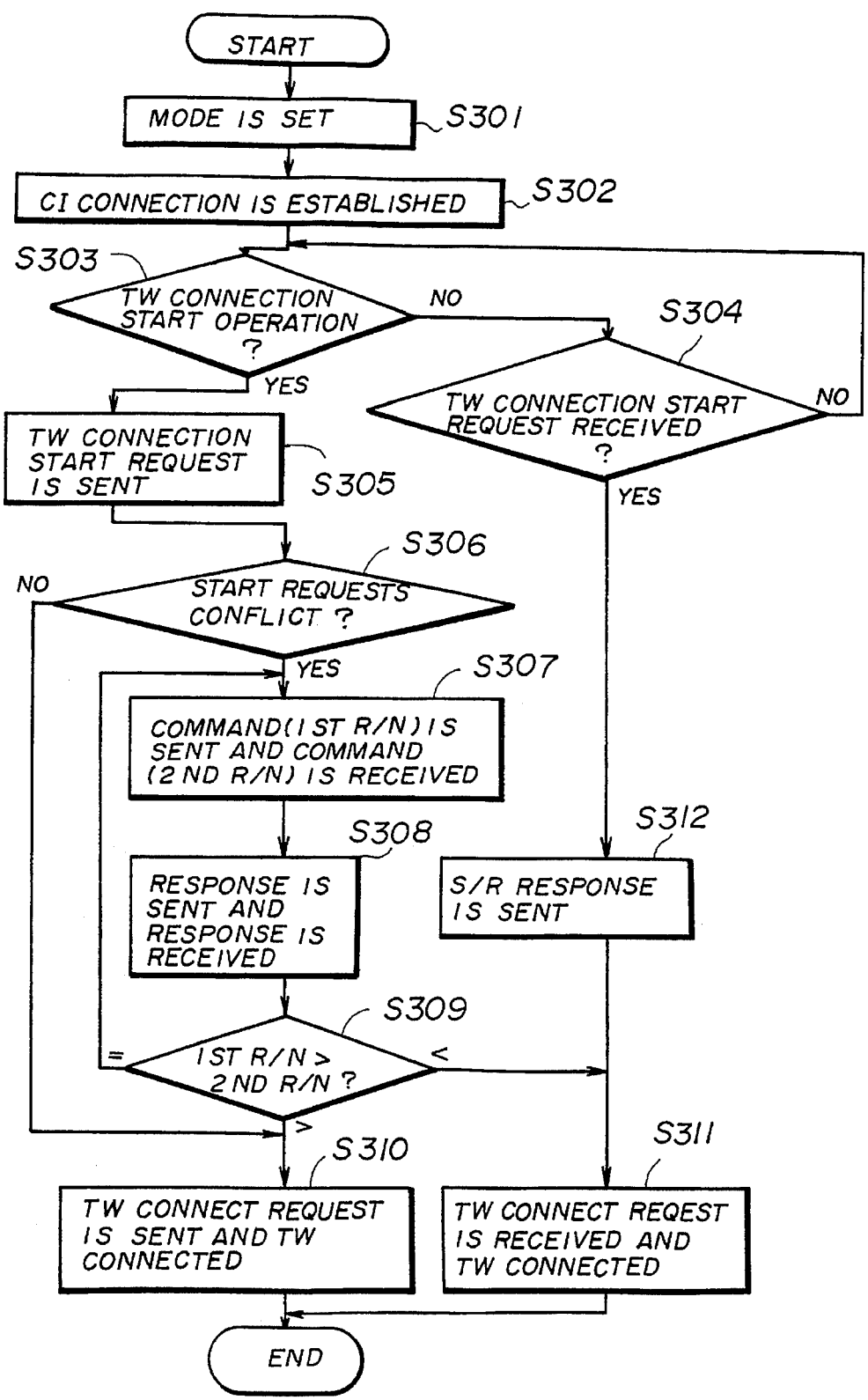
FIG.13 is a flow diagram for explaining the operation of the communication system in the second embodiment.
Figure 14:
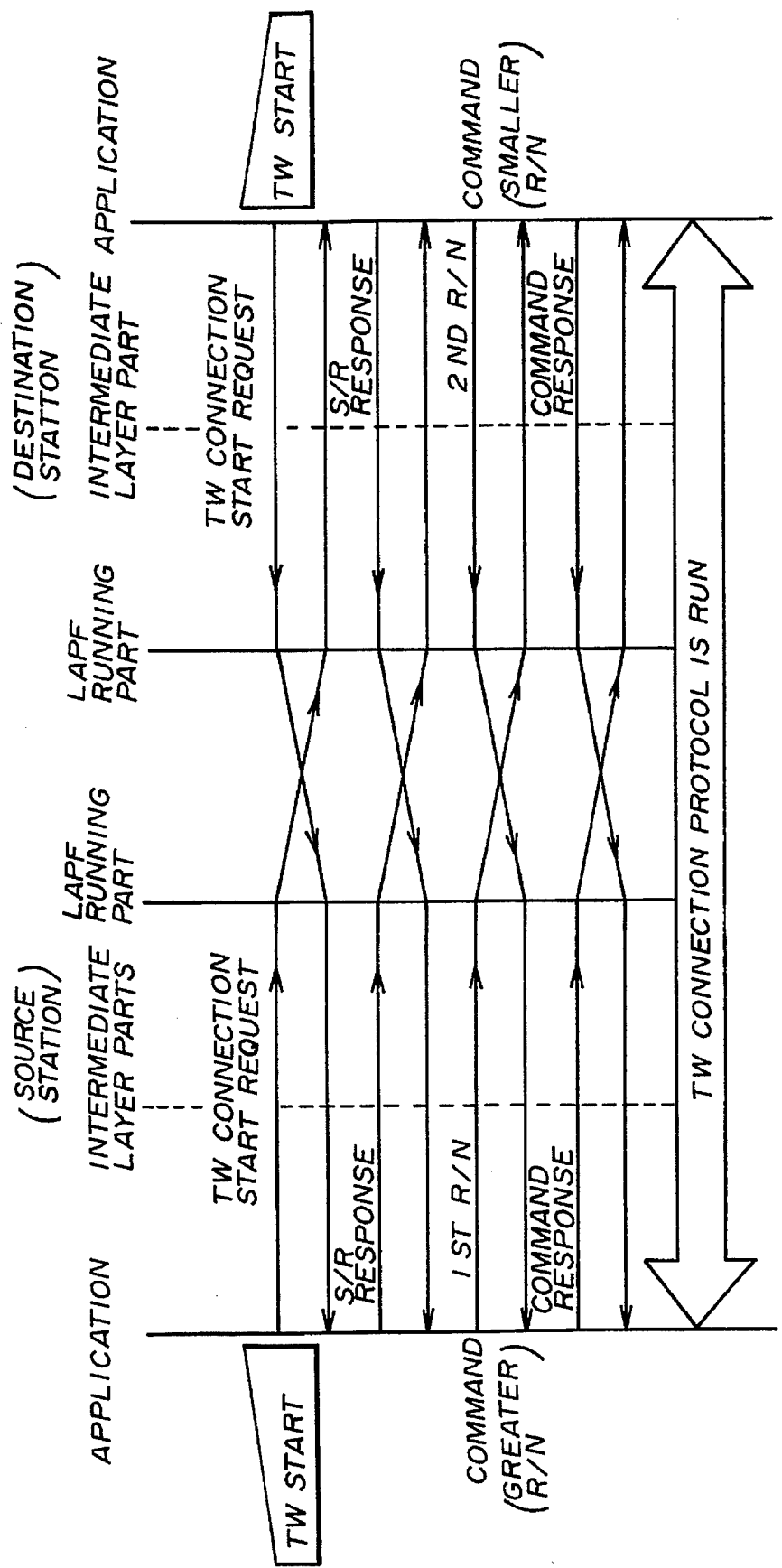
FIG.14 is a diagram showing transmission control procedures in the second embodiment.

FIG.13 shows the operation of the communication system in the second embodiment when a teleconference between the two stations over ISDN is started. In FIG.13, step S301 sets the AUDIO+VIDEO+ MLP mode after the transport connections (the B channels) between the source station and the destination station over ISDN are established, similarly to the first embodiment previously described. Step S302 sends a CI connection request from the source station to the destination station. The CI connection between the two stations over ISDN is established at step S302. By using the CI connection, full-duplex data transmission between the two stations over ISDN is realized.

After the CI connection is established, step S303 detects whether or not the operator at the source station has issued a TW connection start command to the destination station. If the result at step S303 is negative, step S304 detects whether or not the source station has received a TW connection start request from the destination station. If the result at step S304 is negative, the above steps S303 and S304 are repeated until either the result at step S303 or the result at step S304 becomes affirmative.

If the result at step S303 is affirmative, step S305 sends a TW connection start request from the source station to the destination station, awaits a response to the TW connection start request from the destination station, and confirms the reception of the response at the source station.

After the TW connection start request from the source station is sent at step S305, step S306 detects whether or not the TW connection start requests are issued from both the source station and the destination station at the same time.

The TW connection start commands may possibly be issued at the same time by the operators at the two stations. In such a case, the TW connection start request from the source station is sent to the destination station, and, at the same time, the TW connection start request from the destination station is sent to the source station. FIG.14 shows the transmission control procedures in the second embodiment when the TW connection start requests issued from the two stations conflict with each other. The operation of the communication system in FIG.13 is intended to prevent the occurrence of a connection error due to the conflict of the two TW connection start requests issued at the same time.

When the result at step S306 is affirmative, the TW connection start requests are issued from the two stations at the same time. At step S307, each of the application programs of the two stations generates a random number by the internal process, and sets the random number to a CI (control and indication) command. At step S307, the application program of the source station sends a first CI command to the application program of the destination station, and the application program of the destination station sends a second CI command to the application program of the source station. Thus, both the application programs of the two stations receive a CI command from each other.

After the application programs of the two stations have received the CI commands from each other, step S308 sends a CI response of the source station to the destination station, and sends a CI response of the destination station to the source station. Each of the application programs of the two stations receives a CI response from the other station. Thus, the application program of the source station can recognize the first random number, generated by the application program of the source station itself, and the second random number, received from the application program of the destination station. Similarly, the application program of the destination station can recognize the second random number, generated by itself, and the first random number, received from of the source station.

Step S309 compares the first random number, generated by the source station itself, with the second random number received from the other station. When the first random number is detected, at step S309, to be greater than the second random number, the application program of the source station sends a TW connection request to the application program of the other station at step S3. The TW connection protocol is run to establish the TW connection between the two stations over ISDN.

When the first random number is detected, at step S309, to be smaller than the second random number, the application program of the source station awaits a TW connection request, issued from the application program of the destination station, and confirms the reception of that TW connection request at the source station, at step S311. The TW connection protocol is run to establish the TW connection between the two stations over ISDN.

When the step S309 detects that the first random number is equal to the second random number, the above steps S307 through S309 are repeated until the first and second random numbers are different from each other. Thus, either the source station or the destination station sends a TW connection request so that the TW connection protocol is run without causing a connection error, to establish the TW connection between the two stations over ISDN. By using the TW connection, half-duplex data transmission between the two stations over ISDN is realized.

When the result at step S306 is negative, the TW connection start requests have not been issued from the two stations at the same time. At this time, the above step S3 is performed. That is, the application program of the source station sends a TW connection request to the application program of the destination station. After the TW connection request is received by the destination station, the TW connection protocol is run so as to establish the TW connection between the two station over ISDN.

When the result at step S304 is affirmative, the application program of the source station has received a TW connection start request from the destination station. Step S312 sends a response to the TW connection start request to the destination station. After the response from the source station is received by the destination station, the above step S311 is performed. That is, the application program of the source station awaits a TW connection request, issued from the application program of the destination station, and confirms the reception of that TW connection request at the source station. The TW connection protocol is thus run so as to establish the TW connection between the two stations over ISDN.

In the communication system operation in the second embodiment in FIG.13, after the AUDIO+VIDEO MLP mode is set and the MLP communication channel is established, the source station sends a CI connection request to the destination station, so that the CI connection between the two stations over ISDN is established. If the operator on the source station has issued a TW connection start command to the destination station, the destination station is informed of the start of the TW connection. If the TW connection start requests have been issued from the two stations at the same time, a first random number, generated by the source station, is compared with a second random number, received from the destination station, and then a TW connection request is sent from the source station to the destination station if the first random number is detected to be greater than the second random number.

Since the TW connection request can always be sent from either the source station or the destination station, the TW connection between the two stations over ISDN can be efficiently established without causing a connection error even when TW connection start commands are issued from the two stations at the same time.

Next, a description will be given, with reference to FIGS.15 through FIG.17, of the operation of the communication system in the third embodiment.

Figure 15:
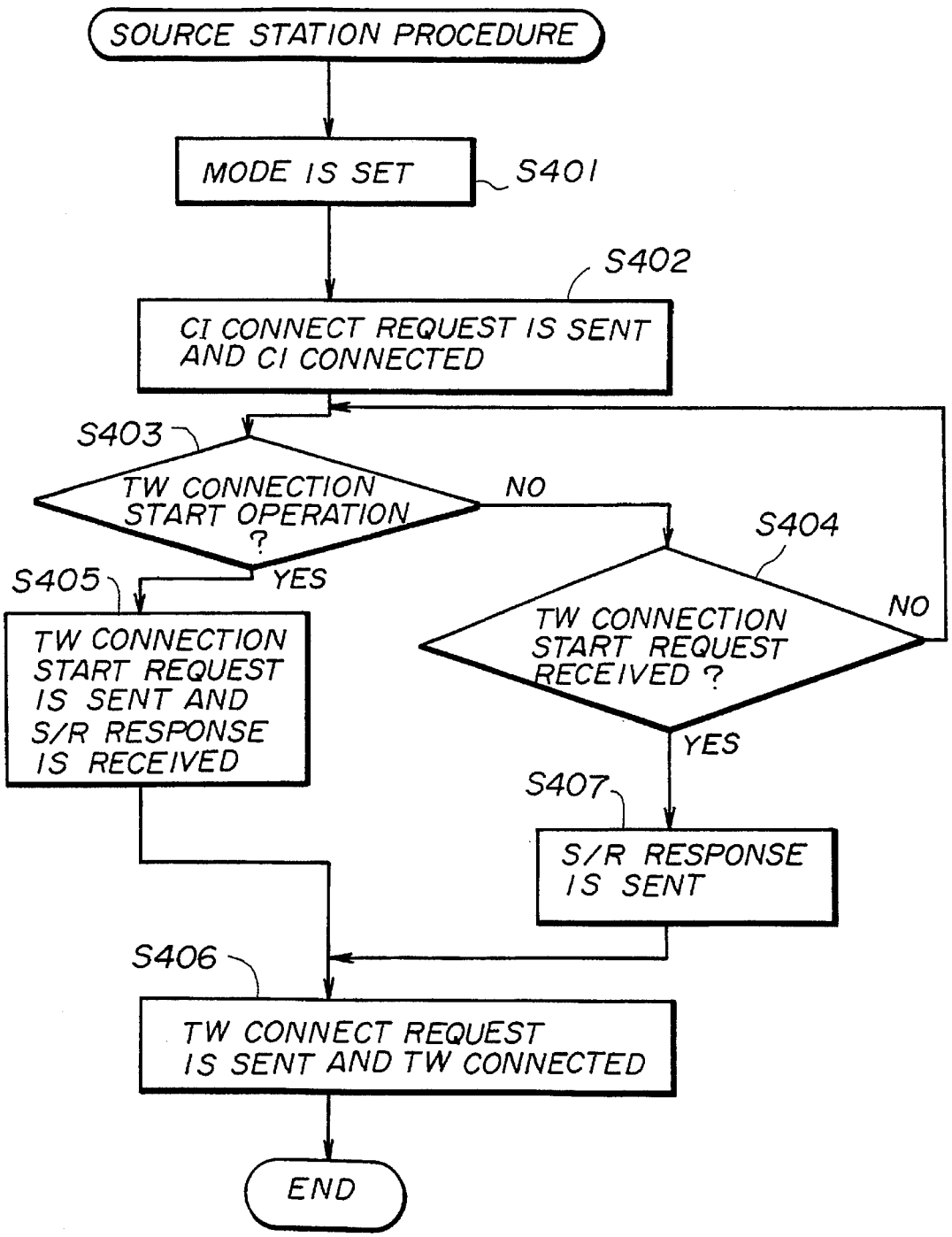
FIG.15 is a flow diagram for explaining the operation of a source station in the third embodiment.

FIG. 15 shows the operation of the source station of the communication system in the third embodiment when a teleconference between the source station and the destination station over ISDN is started. In FIG.15, step S401 sets the AUDIO+VIDEO+ MLP mode to the source station after the transport connections (the B channels) between the source station and the destination station is established, similarly to the above described first and second embodiments. Step S402 sends a CI connection request from the source station to the destination station. The CI connection between the two stations over ISDN is established at step S402.

After the CI connection is established, step S403 detects whether or not the operator at the source station has issued a TW connection start command to the destination station. If the result at step S403 is negative, step S404 detects whether or not the source station has received a TW connection start request issued from the destination station. If the result at step S404 is negative, the above steps S403 and S404 are repeated until either the result at step S403 or the result at step S404 becomes affirmative.

If the result at step S403 is affirmative, step S405 sends a TW connection start request from the source station to the destination station, and confirms the reception of a TW connection start request response from the destination station at the source station.

After the TW connection start request is sent to the destination station and the response from the destination station is received at step S405, step S406 sends a TW connection request from the source station to the destination station. A TW connection protocol between the two stations is thus performed at step S406, so that a TW connection between the two stations over ISDN is established.

If the result at step S404 is affirmative, the source station has received a TW connection start request issued from the destination station.

Step S407 sends a response to the TW connection start request to the destination station. After the response from the source station is sent to the destination station, the above step S406 is performed. That is, the source station sends a TW connection request to the destination station, and a TW connection protocol between the two stations is thus performed, so that a TW connection between the two stations over ISDN is established.

Figure 16:
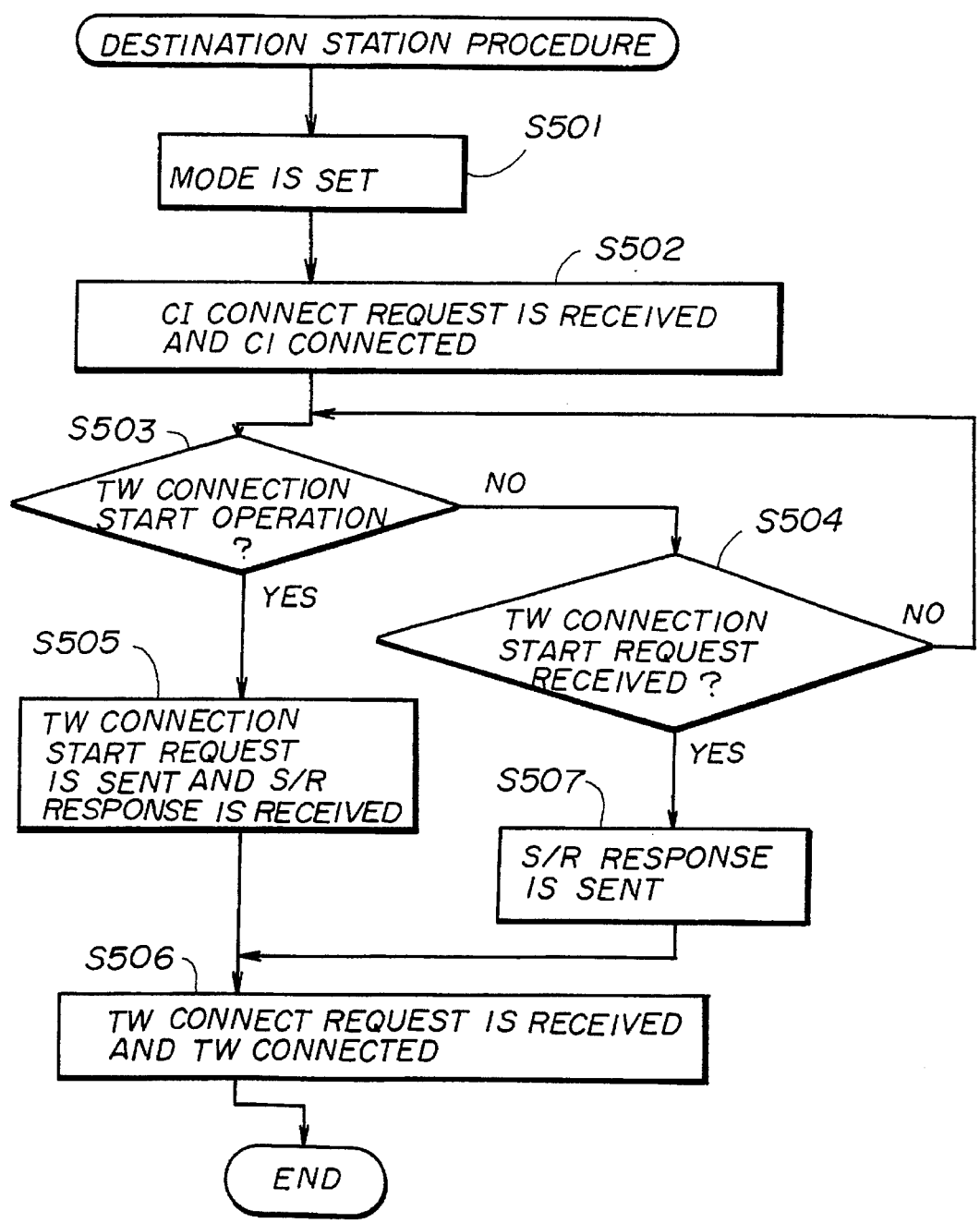
FIG.16 is a flow diagram for explaining the operation of a destination station in the third embodiment.

On the other hand, FIG.16 shows the operation of the destination station of the communication system in the third embodiment when the teleconference between the two stations over ISDN is started, which corresponds to the operation of the source station in FIG.15. In FIG.16, step S501 sets the AUDIO+VIDEO+MLP mode to the destination station after the transport connections (the B channels) between the source station and the destination station are established. Step S502 awaits a CI connection request issued from the source station, and confirms the reception of the CI connection request at the destination station. The CI connection protocol between the two stations is performed at step S502, so that the CI connection between the two stations over ISDN is established.

After the CI connection is established, step S503 detects whether or not the operator at the destination station has issued a TW connection start command to the source station. If the result at step S503 is negative, step S504 detects whether or not the destination station has received a TW connection start request issued from the source station. If the result at step S504 is negative, the above steps S503 and S504 are repeated until either the result at step S503 or the result at step S504 becomes affirmative.

If the result at step S503 is affirmative, step S505 sends a TW connection start request from the destination station to the source station, and confirms the reception of a TW connection start request response from the source station at the destination station. After the reception of the response at the destination station is confirmed, step S506 awaits a TW connection request, issued from the source station, and confirms the reception of the TW connection request at the destination station. A TW connection protocol between the two stations is run at step S506, so that the TW connection between the two stations over ISDN is established.

If the result at step S504 is affirmative, the destination station has received a TW connection start request issued from the source station. Step S507 sends a response to the TW connection start request, to the source station. After the response from the destination station is sent to the source station, the above step S506 is performed. That is, a TW connection request issued from the source station is received at the destination station, and the reception of the TW connection request at the destination station is confirmed at step S506. A TW connection protocol between the two stations is run at step S506, so that the TW connection between the two stations over ISDN is established.

In the third embodiment described above, the TW connection start commands may possibly be issued at the same time by the operators at the two stations. In such a case, a first TW connection start request from the source station is sent to the destination station, and, at the same time, a second TW connection start request from the destination station is sent to the source station.

Figure 17:
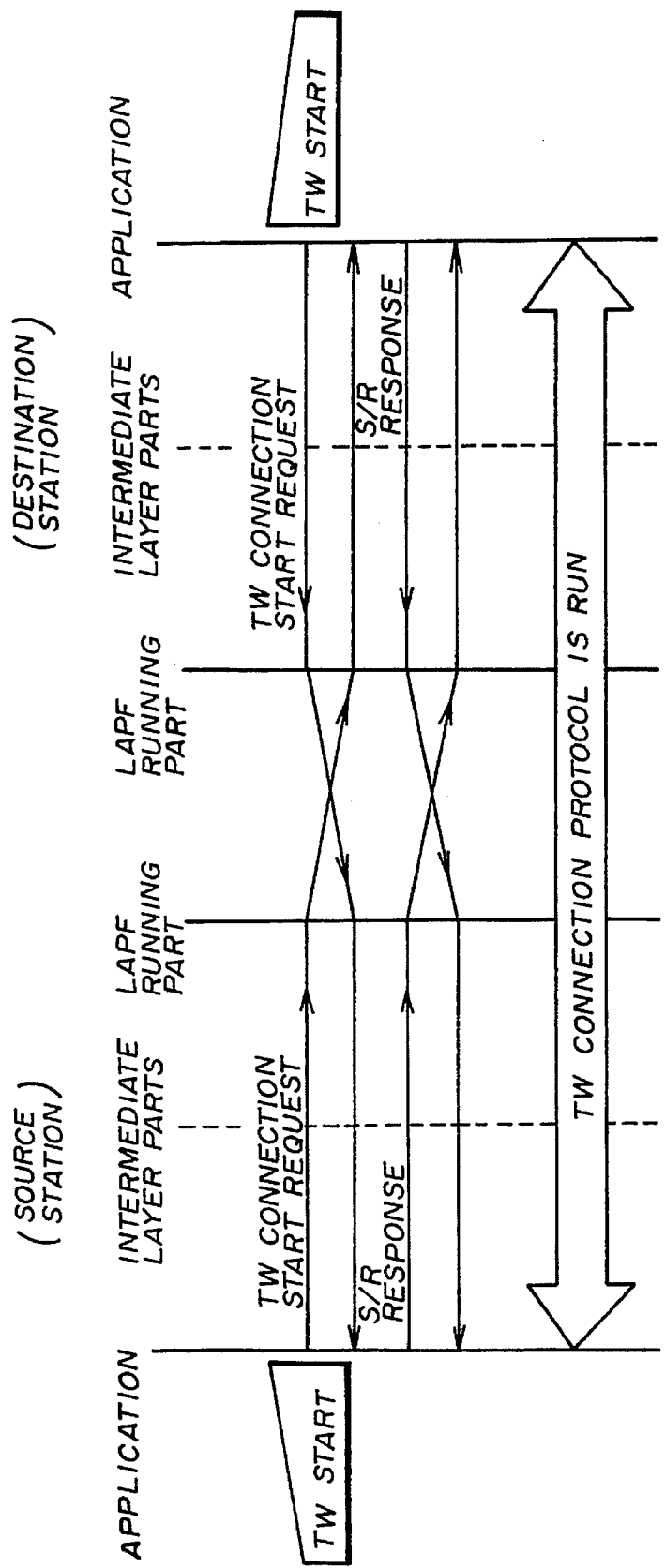
FIG.17 is a diagram showing transmission control procedures in the third embodiment.

FIG.17 shows the transmission control procedures in the third embodiment when the TW connection start requests issued from the two stations conflict with each other. As shown in FIG.17, a response to the first TW connection start request is sent from the destination station to the source station, and, at the same time, a response to the second TW connection start request is sent from the source station to the destination station. In such a case, the operation (the above step S406 in FIG.15) of the source station and the operation (the above step S506 in FIG.16) of the destination station are performed, and the TW connection request is sent from the source station to the destination station in only one transmitting direction, so that the TW connection between the two stations is established. Therefore, in the third embodiment, it is possible to prevent the occurrence of a connection error due to the conflict of the two TW connection start requests issued at the same time.

In the first through third embodiments described above, the MLP (multi-layer protocol) in conformity with the CCITT Q.221 standard is used to transmit the CI signal and the TW data signal over ISDN. The present invention is not limited to these embodiments, and the LSD (low speed data) in conformity with the CCITT Q.221 standard may be used instead to transmit the CI signal and the TW data signal over ISDN.

In the above described communication system shown in FIGS.4 through 7, it is necessary to establish a TW connection between the two telewriting terminals 1 and 11 over ISDN when a teleconference between the two video conference stations 2 and 12 is started. The communication system according to the present invention is intended to efficiently start the TW connection between the two telewriting terminals over ISDN. The communication system according to the present invention is intended to prevent the occurrence of the connection error due to the conflict between the connection requests from the two terminals.

The TW connection requests may possibly be issued at the same time from the two telewriting terminals when the communication system is set to an auto-start mode. In the auto-start mode, a TW connection between the two telewriting terminals over ISDN is automatically established when the ON state of at least one of the two terminals is detected.

The operation of the communication system in the fourth embodiment, which will be described below, is intended to efficiently start the TW connection between the two terminals over ISDN when the communication system is set to the auto-start mode.

Next, a description will be given, with reference to FIGS.18, 19A and 19B, of an auto-start mode operation of the communication system in the fourth embodiment. By setting the communication system to the auto-start mode which will be described below, a TW connection between the source terminal and the destination terminal over ISDN can be automatically established.

Figure 18:
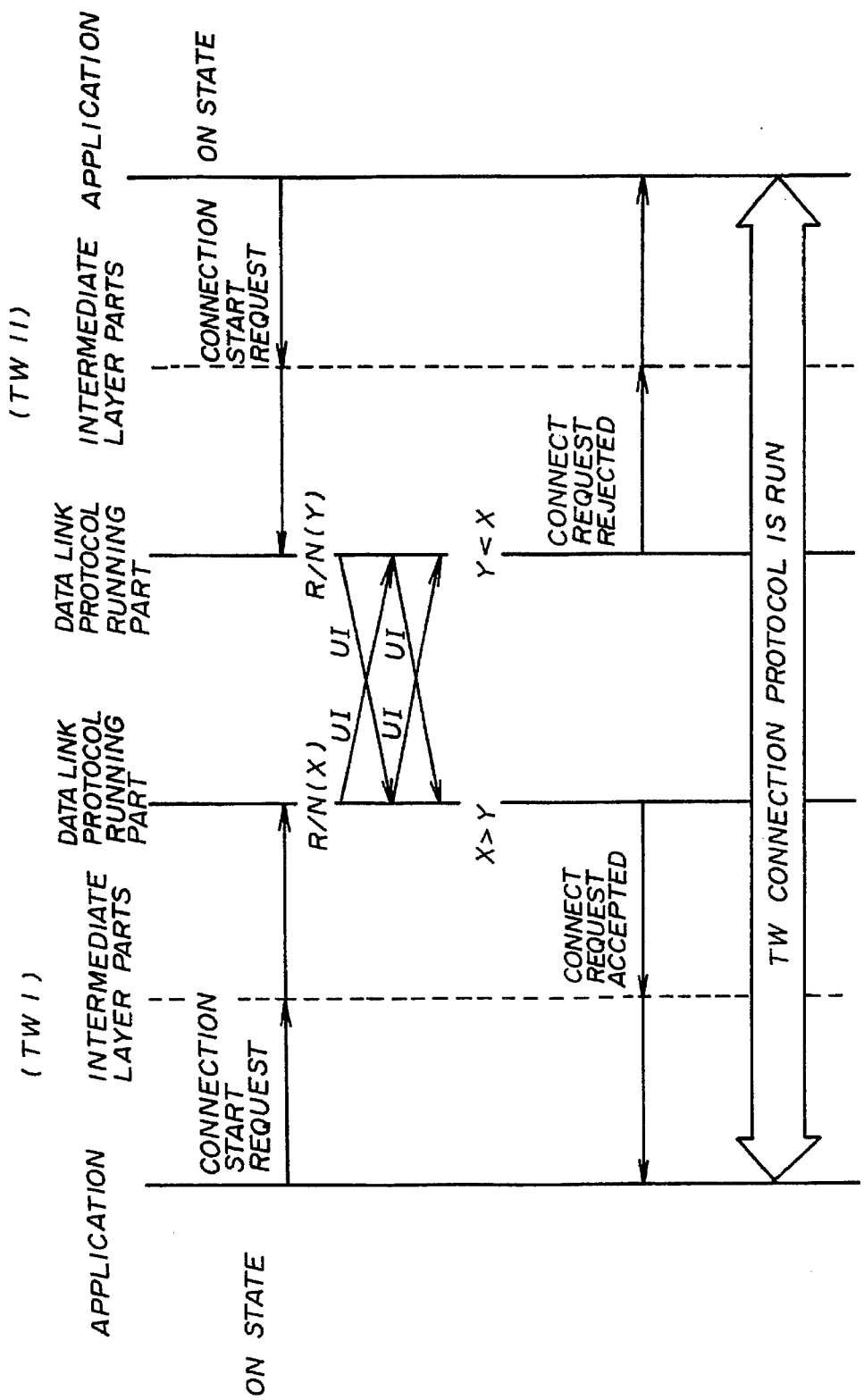
FIG.18 is a diagram showing transmission control procedures in the fourth embodiment.

FIG.18 shows the procedure of a connection establishment in the fourth embodiment. FIGS.19A and 19B show the transmission control procedures for carrying out the connection establishment procedure in FIG.18 when the ON state of at least one of the two telewriting terminals is detected.

Figure 19A:
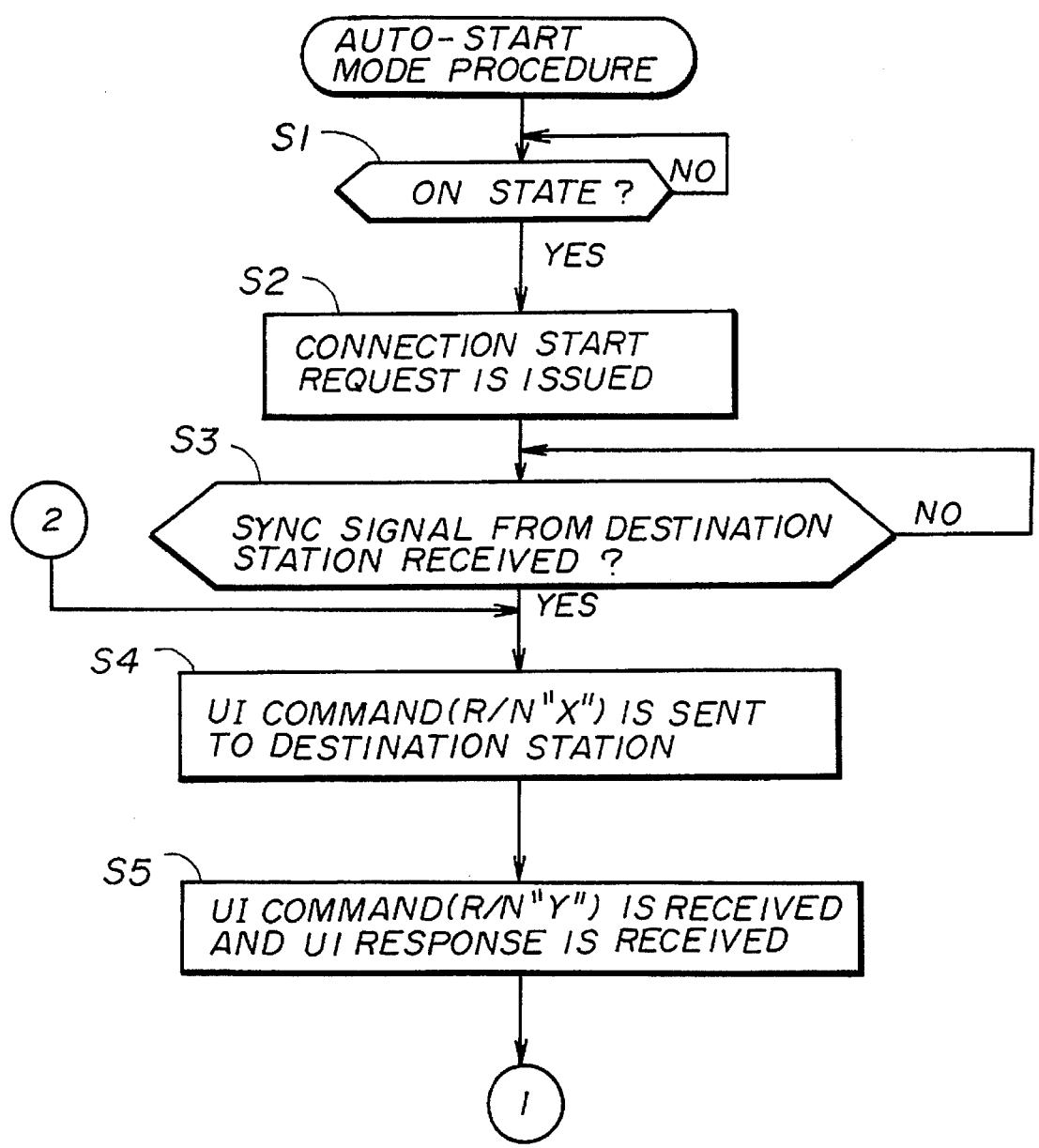
FIGS.19A and 19B are a flow diagram for explaining the procedure of a connection establishment in the fourth embodiment.

In the transmission control procedures in FIG.19A, step S1 detects whether or not the power of the telewriting terminal 1 (or the telewriting terminal 11) is ON. Hereinafter, the telewriting terminal 1 is referred to as the source terminal and the telewriting terminal 11 is referred to as the destination terminal, for the sake of convenience.

If the result at step S1 is affirmative, step S2 transfers a connection start request from the application program of the source terminal to the data link protocol running part thereof. After the connection start request from the application program is received, the data link protocol running part of the source terminal sends a sync signal to the data link protocol running part of the destination terminal over the network. Step S3 detects whether or not the data link protocol running part of the source terminal has received a sync signal from the destination terminal.

If the result at step S3 is negative, the reception of a sync signal of the destination terminal is not detected. At this time, it is determined that the destination terminal is not yet in the ON state. The data link protocol running part of the source terminal awaits a sync signal from the destination terminal until the destination terminal is powered ON.

If the result at step S3 is affirmative, the reception of a sync signal of the destination terminal is detected. At this time, it is determined that both the two terminals are in the ON state. At step S4, the data link protocol running part of the source terminal generates a first random number "X" and issues a UI (unnumbered information) command including the first random number to the counterpart of the destination terminal, and, at the same time, the data link protocol running part of the destination terminal generates a second random number "Y" and issues a UI command including the second random number back to the counterpart of the source terminal.

At step S5, the data link protocol running part of the source terminal sends a UI response to the counterpart of the destination terminal after the UI command (the second random number "Y") of the destination terminal has been received. Thus, the data link protocol running part of the source terminal can recognize the first random number "X" and the second random number "Y". At step S5, the data link protocol running part of the destination terminal sends a UI response to the counterpart of the source terminal after the UI command (the first random number "X") of the source terminal has been received. Thus, the data link protocol running part of the destination terminal can also recognize the first random number "X" and the second random number "Y".

Figure 19B:
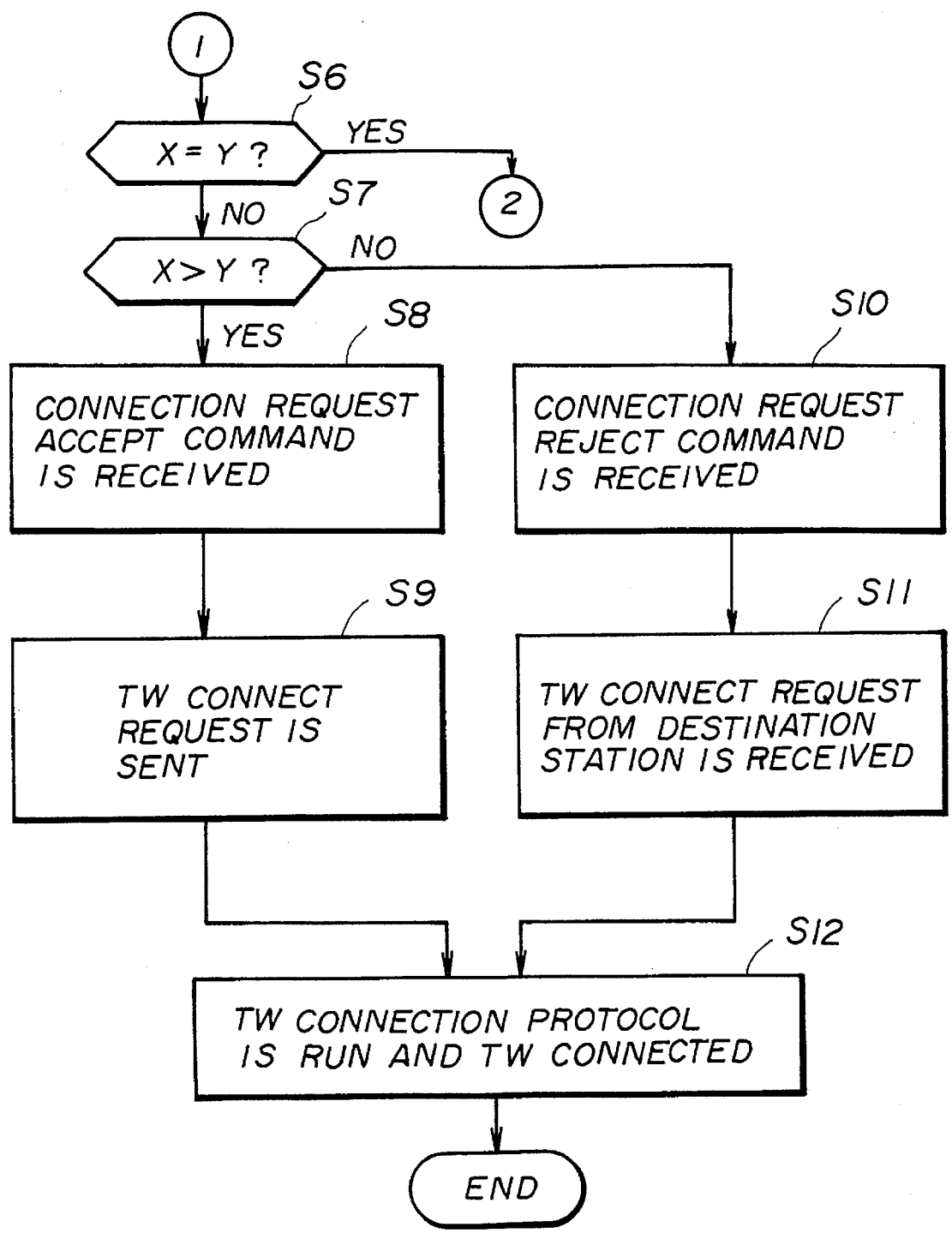

In the transmission control procedures in FIG. 19B, step S6 detects whether or not the first random number "X" is equal to the second random number "Y". If the result at step S6 is affirmative, the above steps S4 and S5 are repeated until the two random numbers become different from each other. If the result at step S6 is negative, step S7 detects whether or not the first random number "X" is greater than the second random number "Y".

If the result at step S7 is affirmative, the first random number "X", generated by the source terminal itself, is detected to be greater than the second random number "Y" received from the destination terminal. At step S8, the data link protocol running part of the source terminal transfers a connection request accept command to the application program thereof. At step S9, the application program of the source terminal issues a connection request to the destination terminal, and allows the lower layers to run a given connection protocol between the two stations.

On the other hand, if the result at step S7 is negative, it is detected that the first random number "X" is not greater than the second random number "Y". At this time, the destination terminal detects that the second random number "Y", generated by the destination terminal itself, is smaller than the first random number "X" received from the source terminal. At step S, the data link protocol running part of the destination terminal transfers a connection request reject command to the application program thereof. At step S11, the application program of the destination terminal awaits a connection request issued from the source terminal.

After either the above step S9 or the above step S11 is performed, the TW connection between the two terminals over the ISDN is established at step S12 without causing a connection error.

Accordingly, if the communication system is set to the auto-start mode according to the fourth embodiment described above, the TW connection between the two telewriting terminals is automatically established when the ON state of at least one of the two telewriting terminals is detected. Any special operation, manually performed by the operator at the telewriting terminal to establish the TW connection between the two terminals, will be unnecessary, except for the switching ON of the power switch of the telewriting terminal. It is possible for the fourth embodiment described above to prevent the occurrence of a connection error even when the two telewriting terminals are powered ON at the same time.

Next, a description will be given, with reference to FIGS. 20, 21A and 21B, of a manual-start mode operation of the communication system in the fifth embodiment. By setting the communication system to the manual-start mode which will be described below, a TW connection between the source terminal and the destination terminal over ISDN can be automatically established even when the two terminals have issued connection start requests to each other in a conflicting manner. According to the fifth embodiment, it is not necessary for the operator at the telewriting terminal to perform an additional manual operation in order to establish the TW connection between the two terminals over the ISDN when the connection start requests of the two terminals conflict with each other.

FIG. 20 shows the connection establishment procedure in the fifth embodiment. FIGS. 21A and 21B show the transmission control procedures for carrying out the connection establishment procedure in FIG. 20 when a conflict between the connection requests issued from the two stations is detected. Since steps S27 and S28 in FIG. 21A are the same as the above steps S4 and S5 in FIG. 19A, and since steps S29 through S35 in FIG. 21B are the same as the above steps S6 and S12 in FIG. 19B, a description thereof will be omitted.

Figure 21A:
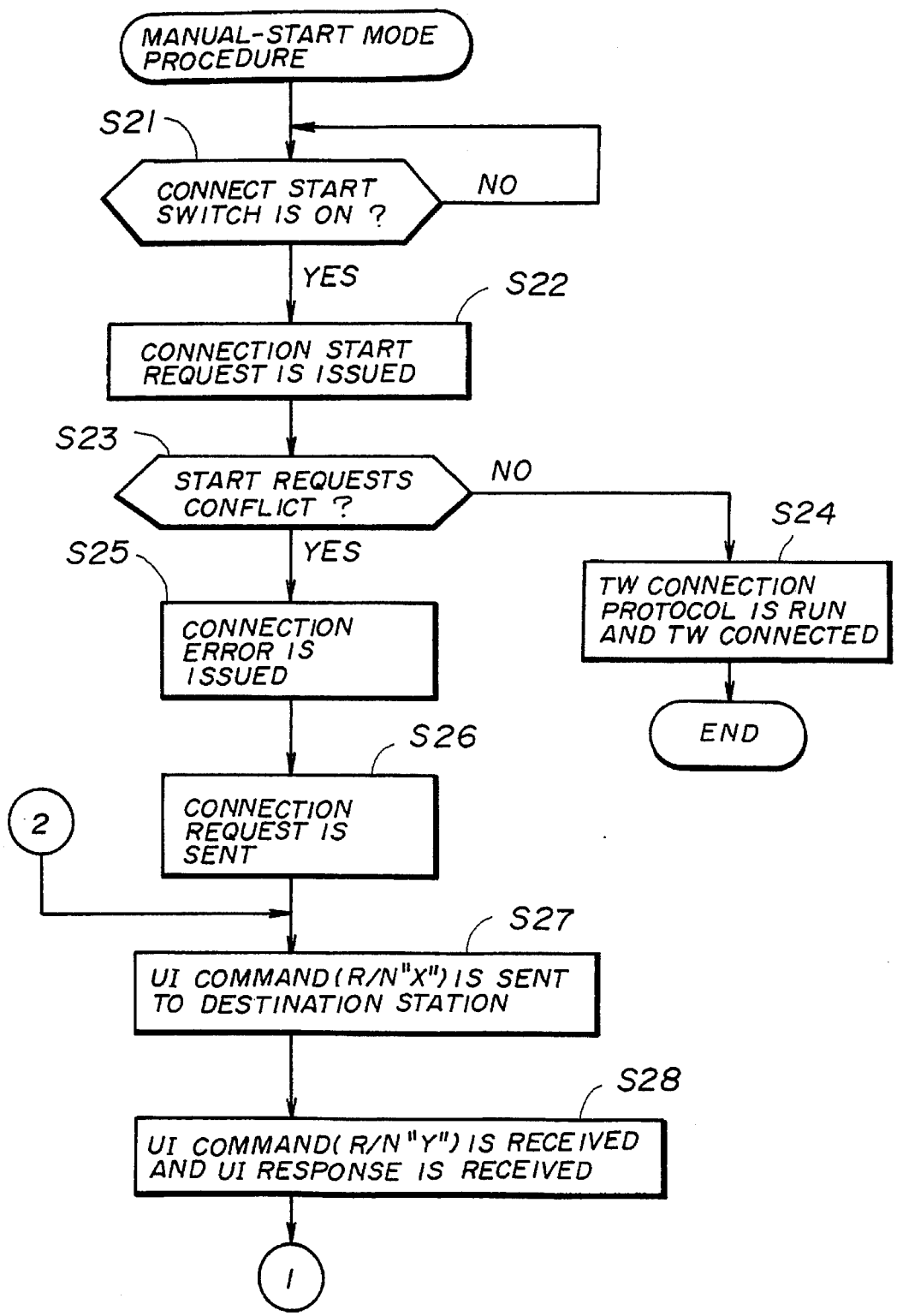
FIGS.21A and 21B are a flow diagram for explaining the procedure of a connection establishment in the fifth embodiment.

In the transmission control procedures in FIG. 21A, step S21 detects whether the operator at one of the two telewriting terminals 1 and 11 turns ON a connection start switch of the button areas of the touch panel of the drawing input unit 25 by using a special touch pen of the drawing input unit 25. The connection start switch of the drawing input unit 25 is turned ON by the operator in order to start a TW connection between the two terminals. Hereinafter, a case in which the connection start switches on both the source terminal and the destination terminal are turned ON at the same time, as shown in FIG. 20, will be taken into consideration.

As the connection start switches on both the source terminal and the destination terminal are turned ON at the same time, the application program of the source terminal issues a TW connection start request to the data link protocol running part thereof, and the application program of the destination terminal issues a TW connection start request to the data link protocol running part thereof, at step S22. At this time, the data link protocol running part of the source terminal sends a SABM (set asynchronous balanced mode) command to the destination terminal, and, at the same time, the data link protocol running part of the destination terminal sends a SABM command to the source terminal.

After the above step S22 is performed, if an UA (unnumbered acknowledge) response of one of the two terminals to the SABM command is correctly received by the other terminal, a data link protocol is run by the data link protocol running parts of the two terminals, so that a data link connection between the two terminals is established. A TW connection between the two terminals will be established afterwards.

In the transmission control procedures in FIG. 21A, at step S23, the session protocol running part of each the two terminals detects whether the connection start requests, issued from the two terminals, conflict with each other. If the result at step S23 is negative, no conflict between the connection start requests is detected. In such a case, step S24 starts a TW communication between the two terminals over the ISDN.

In the case shown in FIG. 20, the result at step S23 is affirmative, and the conflict between the connection start requests from the two stations is detected. At step S25, the session protocol running part of each the two terminals informs the application program thereof of the occurrence of a connection error between the two terminals. After the occurrence of the connection error is informed to the application program, the application program of each the two terminals sends a connection request terminal determination request to the data link protocol running part thereof at step S26.

After the connection request terminal determination request is received by the data link protocol running part of each the two terminals, :steps S27 and S28 which are the same as the previously described steps S4 and S5 of the fourth embodiment in FIG. 19A are performed. After the step S28 is performed, steps S29 through steps S35 in FIG. 21B, which are the same as the previously described steps S6 through S12 of the fourth embodiment in FIG. 19B, are performed.

If the communication system is set to the manual-start mode in the fifth embodiment described above, a TW connection between the two terminals over ISDN can be automatically established even when the two terminals have issued connection start requests to each other in a conflicting manner. It is not necessary for the operator at the telewriting terminal to again perform a special operation in order to establish the TW connection between the two terminals over the ISDN after the connection start requests of the two terminals conflict with each other.

In the above described fifth embodiment, the session protocol running part of each the two terminals detects whether the connection start requests, issued from the two terminals, conflict with each other. However, generally speaking, another protocol running part of each the two terminals may detect the conflict between the connection start requests issued from the two terminals. In the case shown in FIG.20, for example, the data link protocol running part detects the conflict between the connection start requests.

In addition, the system control unit 20 of the telewriting terminal 1 in FIG.5 comprises a switching unit for setting the communication system to one of the auto-start mode in the fourth embodiment and the manual-start mode in the fifth embodiment in accordance with the operator's selection. When the connection start switch within the button areas of the touch panel of the drawing input unit 25 is turned ON by the operator, the above switching unit is responsive to the operator's selection, and the communication system is set to the manual-start mode of the fifth embodiment by the switching unit. When the connection start switch is not turned ON by the operator, the switching unit is responsive to the operator's selection, and the communication system is set to the auto-start mode of the fourth embodiment.

Figure 22A:
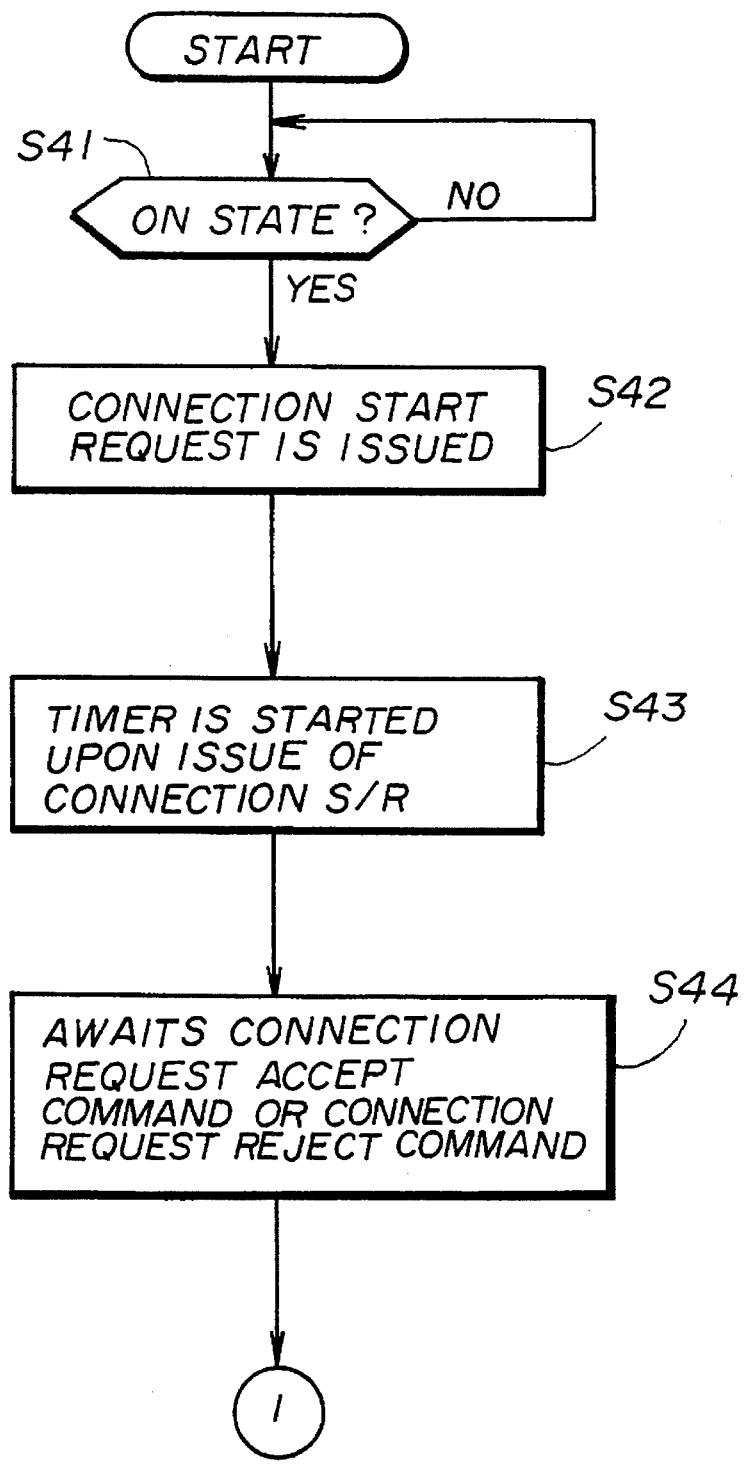
FIGS.22A and 22B are a flow diagram for explaining the procedure of a connection establishment in the sixth embodiment.
Figure 22B:
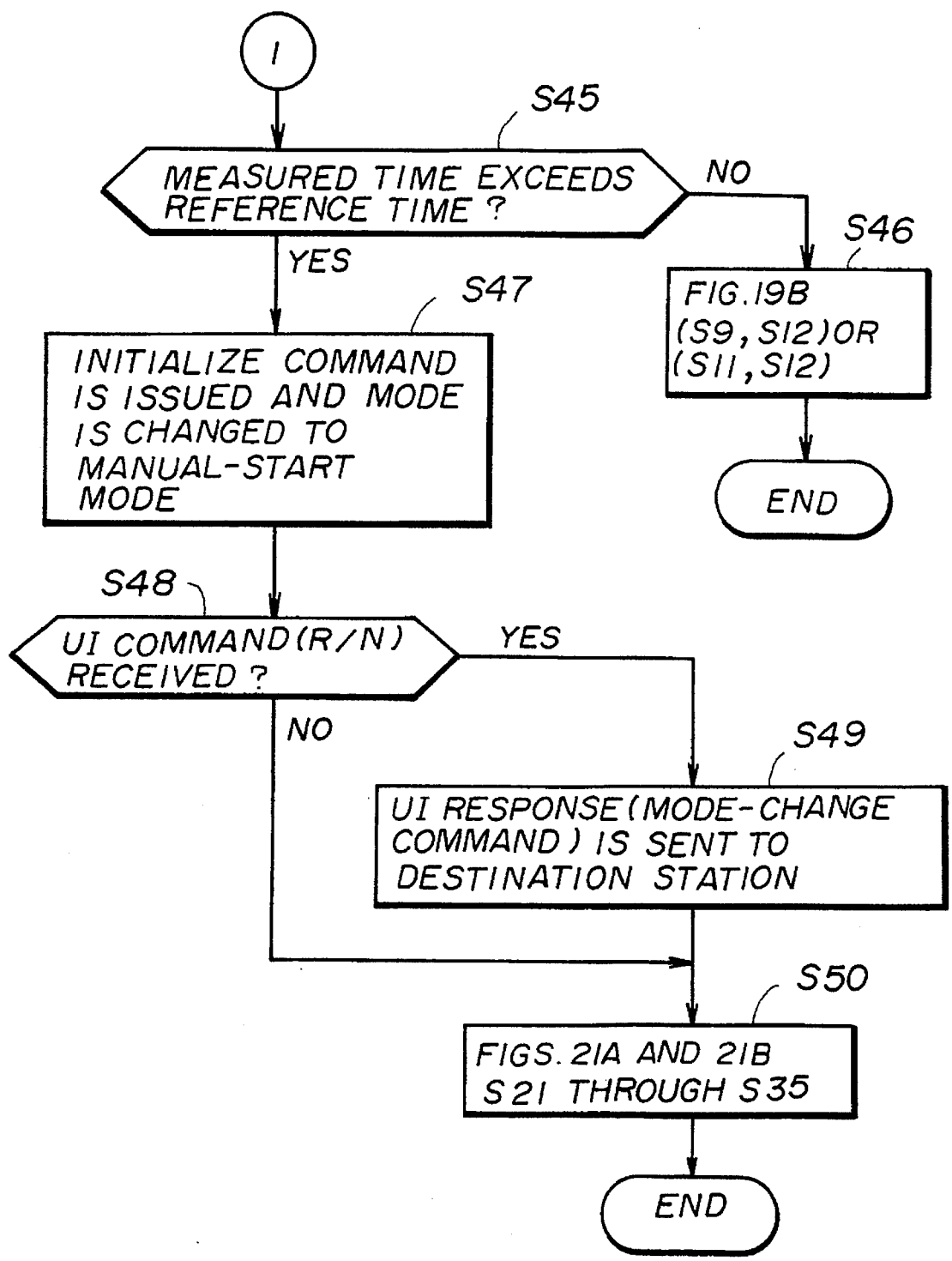

Next, a description will be given, with reference to FIGS.22A and 22B, of the operation of the communication system in the sixth embodiment. FIGS.22A and 22B show the connection establishment procedure of the sixth embodiment.

When the connection request accept command or the connection request reject command is not received within a given reference time during the autostart mode described above, the auto-start mode is changed to the manual-start mode described above. A TW connection between the two stations over ISDN can be established, as in the manner of the fifth embodiment, even when the two terminals have issued the connection start requests to each other in a conflicting manner. According to the sixth embodiment, it is possible that the operator at the telewriting terminal of the source station is notified of the not-ready state of the telewriting terminal of the destination station if a connection request accept command or a connection request reject command from the destination station has not been received within the reference time.

Figure 21B:
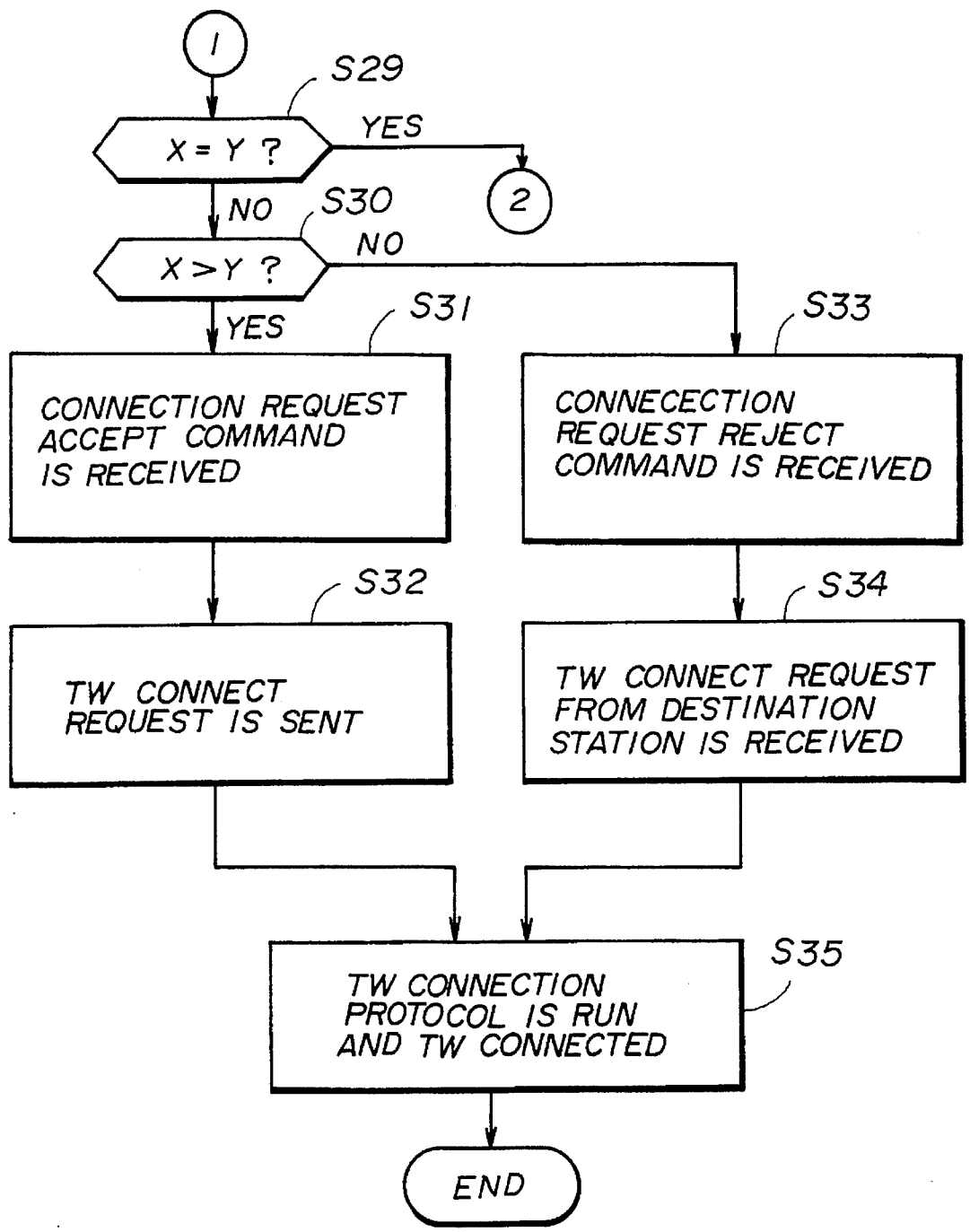

Step S46 in FIG.22B is the same as the above mentioned steps S9 and S12 or S11 and S12 in FIG.19B, and step S50 in FIG.22B is the same as the above mentioned steps S21 through S35 in FIGS.21A and 21B. A description of these steps will be omitted.

In the transmission control procedures in FIG.22A, step S41 detects whether or not the power of the source terminal TW 1 (or the destination terminal TW 11) is ON. When the power of the source terminal is detected to be in the ON state, the application program of the source terminal issues a connection start request to the data link protocol running part of the source terminal at step S42. At the same time as the issue of the connection start request, the application program of the source terminal starts a timer at step S43.

At step S44, the application program of the source terminal awaits the reception of the connection request accept command or the connection request reject command from the data link protocol running part since the issue of the connection start request thereto. If the reception of the above command is detected, a time period from the issue of the connection start request to the reception of the above command is measured by the timer.

In the transmission control procedures in FIG.22B, step S45 detects whether or not the measured time exceeds a given reference time. When the result at step S45 is negative, the connection request accept command or the connection request reject command from the data link protocol running part is received within the reference time. Step S46, the procedure of which is the same as those of the steps S9 and S12 in FIG.19B or those of the steps S11 and S12 in FIG.19B, is performed as in the fourth embodiment.

When the result at step S45 is affirmative, the connection request accept command or the connection request reject command from the data link protocol running part is not received within the reference time. The application program of the source terminal changes the auto-start mode to the manual-start mode at step S47. There are a few reasons for the non-reception of the above mentioned command within the reference time: one reason is that the data signal supplied from the video conference station 2 through the RS-232C line has not been received, another one is that the destination station has not transmitted the sync signal to the source station over the ISDN network, and still another one is that the destination station has not transmitted the connection request accept command or the connection request reject command to the source station. At step S47, the application program of the source terminal issues an initialize command to the intermediate layer parts so as to set the intermediate layer parts to the initial conditions respectively.

After the source terminal is set to the manual-start mode, step S48 detects whether or not the data link protocol running part has received the UI command including the second random number from the destination terminal. When the result at step S48 is affirmative, the data link protocol running part of the source station sends the UI response including a mode-change command to the destination terminal at step S49. The destination terminal TW 11 is informed with the mode-change command that the source terminal has been changed to the manual-start mode, and the destination terminal is also set to the manual-start mode. After the step S49 is performed, the application program of the source terminal performs step S50, the procedure of which is the same as the manual-start mode procedure comprising the steps S21 through S35 in FIGS.21A and 21B, as in the fifth embodiment described above.

According to the sixth embodiment described above, it is possible that the operator at the telewriting terminal of the source station is notified of the not-ready state of the telewriting terminal of the destination station when the connection request accept command or the connection request reject command from the destination station has not received within the reference time. Thus, the operator at the telewriting terminal of the source station can quickly take action to make the telewriting terminal of the destination station in a ready condition.

Figure 23:
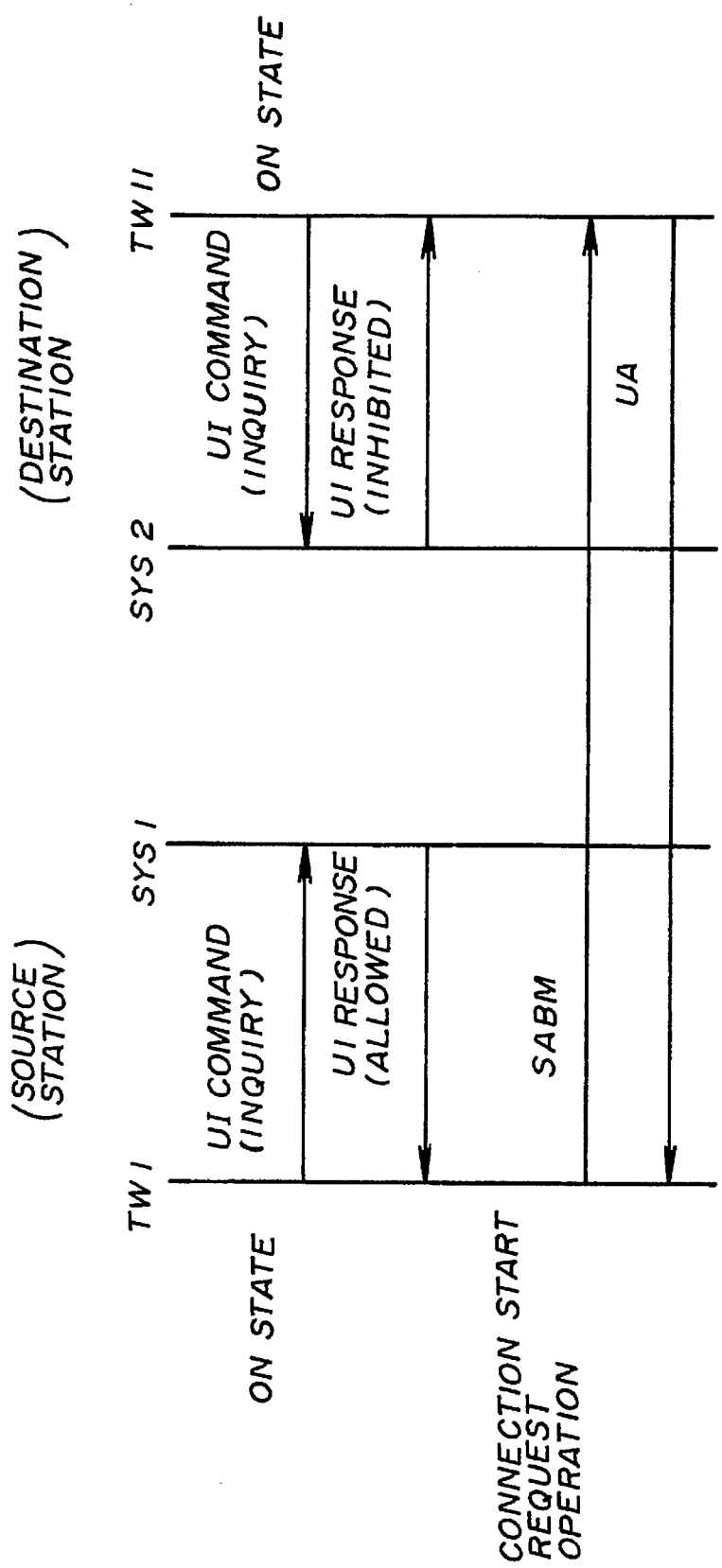
FIG.23 is a diagram showing transmission control procedures in the seventh embodiment.

Next, a description will be given, with reference to FIGS.23 and 24, of the operation of the communication system in the seventh embodiment. FIG.23 shows transmission control procedures in the seventh embodiment, and FIG.24 shows the connection establishment procedure of the seventh embodiment.

According to the connection establishment procedure of the seventh embodiment, an UI response from the video conference station 2 (or the video conference station 12) is received, and it is possible to determine whether the telewriting terminal in question is the source terminal which is allowed to issue a connection start request to the destination terminal, based on the UI response.

Figure 24:
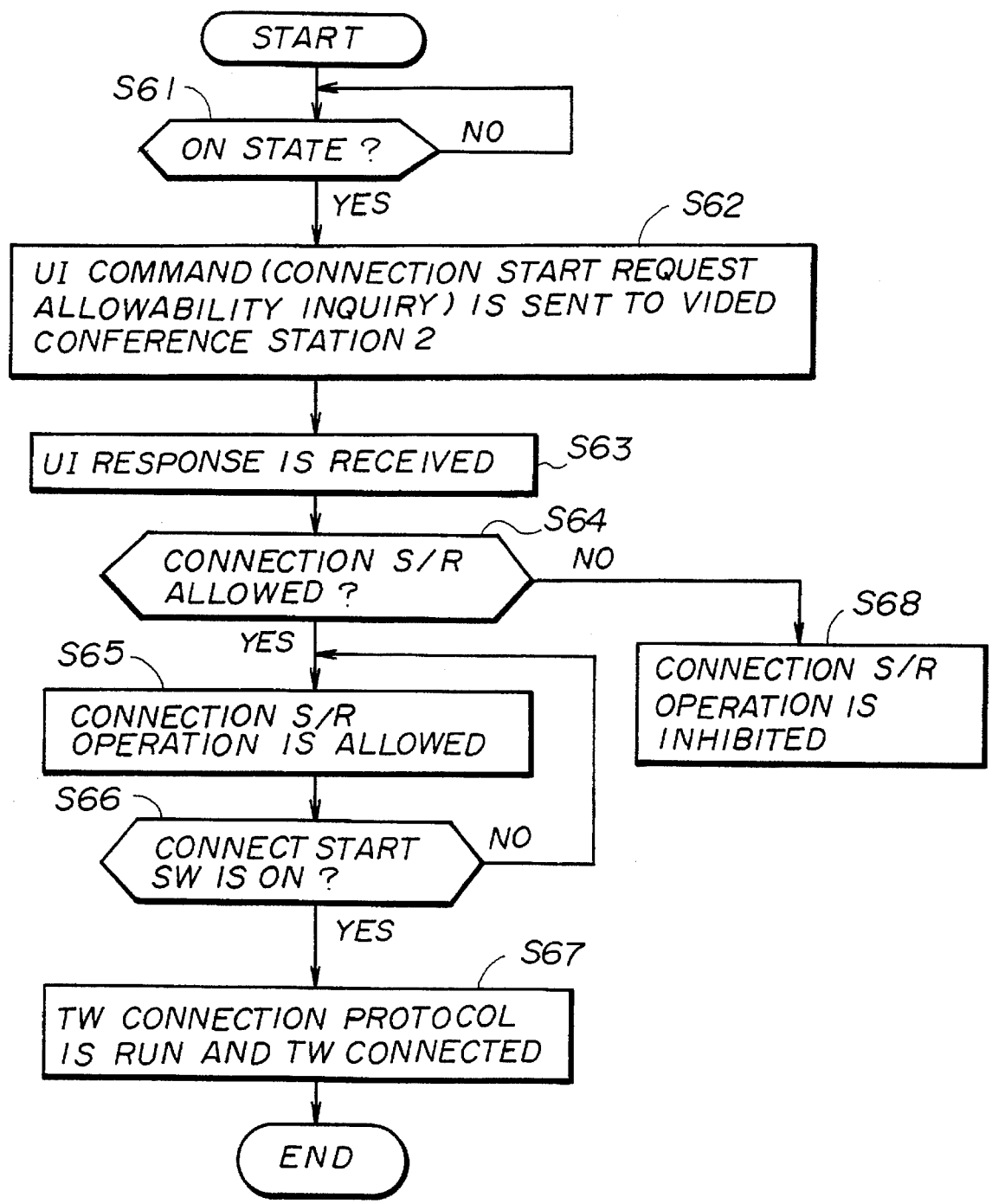
FIG.24 is a flow diagram for explaining the procedure of a connection establishment in the seventh embodiment.

In the connection establishment procedure in FIG.24, step S61 detects whether or not the power of the telewriting terminal TW1 is ON. When the telewriting terminal is in the ON state, the telewriting terminal sends an UI command including a connection start request allowability inquiry to the video conference station 2 at step S62.

After the UI command including the inquiry is received, the video conference station 2 sends an UI response including a connection start request enable command to the telewriting terminal if the video conference station 2 is the source station from which the connection start request is issued. On the other hand, if the video conference station 2 is the destination station to which the connection start request is sent, the video conference station 2 sends, in reply to the inquiry of the telewriting terminal, an UI response including a connection start request inhibit command to the telewriting terminal.

At step S63, the telewriting terminal receives the UI response from the video conference station 2. After the UI response from the video conference station 2 is received, step S64 detects whether or not the received UI response includes a connection start request enable command.

When the result at step S64 is affirmative, it is determined that the telewriting terminal in question is the source terminal that is allowed to issue a connection start request to the destination terminal. Step S65 allows the connection start request operation to be done by the operator when the telewriting terminal 1 is in the ON state. Step S66 detects whether or not the connection start switch of the button areas of the touch panel of the drawing input unit 25 is turned ON by using the touch pen. The steps S65 and S66 are repeated until the connection start switch is turned ON. When the result at step S65 is affirmative, step S67 runs the TW connection protocol so that the TW connection between the telewriting terminals 1 and 11 over the ISDN is established.

On the other hand, when the result at step S64 is negative, it is determined that the telewriting terminal in question is the destination station that is inhibited from issuing a connection start request. Step S68 inhibits the connection start request operation to be done by the operator until the telewriting terminal 1 is in the OFF state.

In the transmission control procedures in FIG.23, the case in which the video conference station 2 is the source station and the video conference station 12 is the destination station, is indicated.

According to the seventh embodiment, it is possible to determine whether the telewriting terminal in question is the source terminal which is allowed to issue a connection start request to the destination terminal, based on the UI response from the video conference station 2 or the video conference station 12. Thus, the TW connection between the two terminals over the ISDN can be established without causing a connection error due to the conflict between the connection start requests.

Figure 25A:
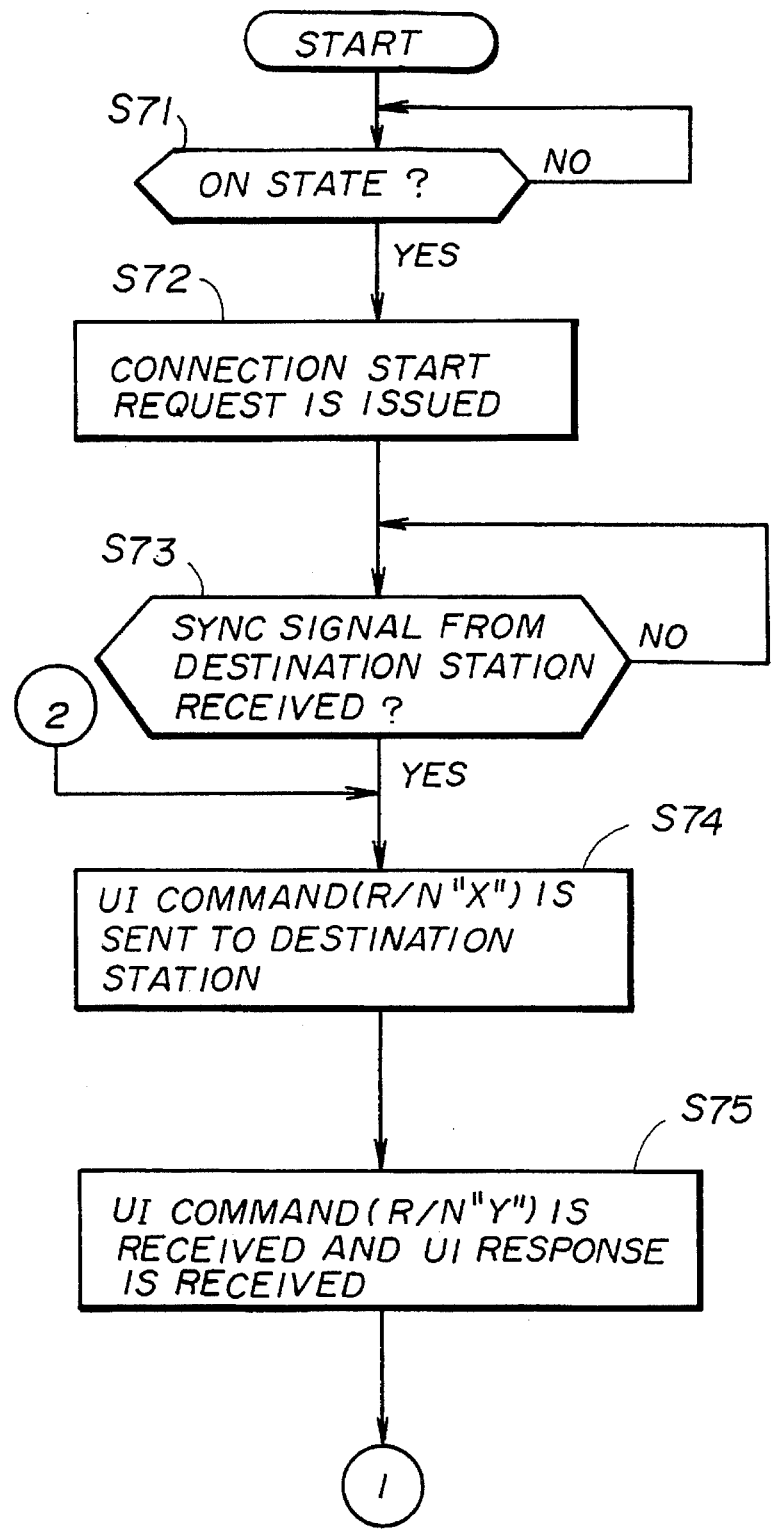
FIGS.25A and 25B are a flow diagram for explaining the procedure of a connection establishment in the eighth embodiment.
Figure 25B:
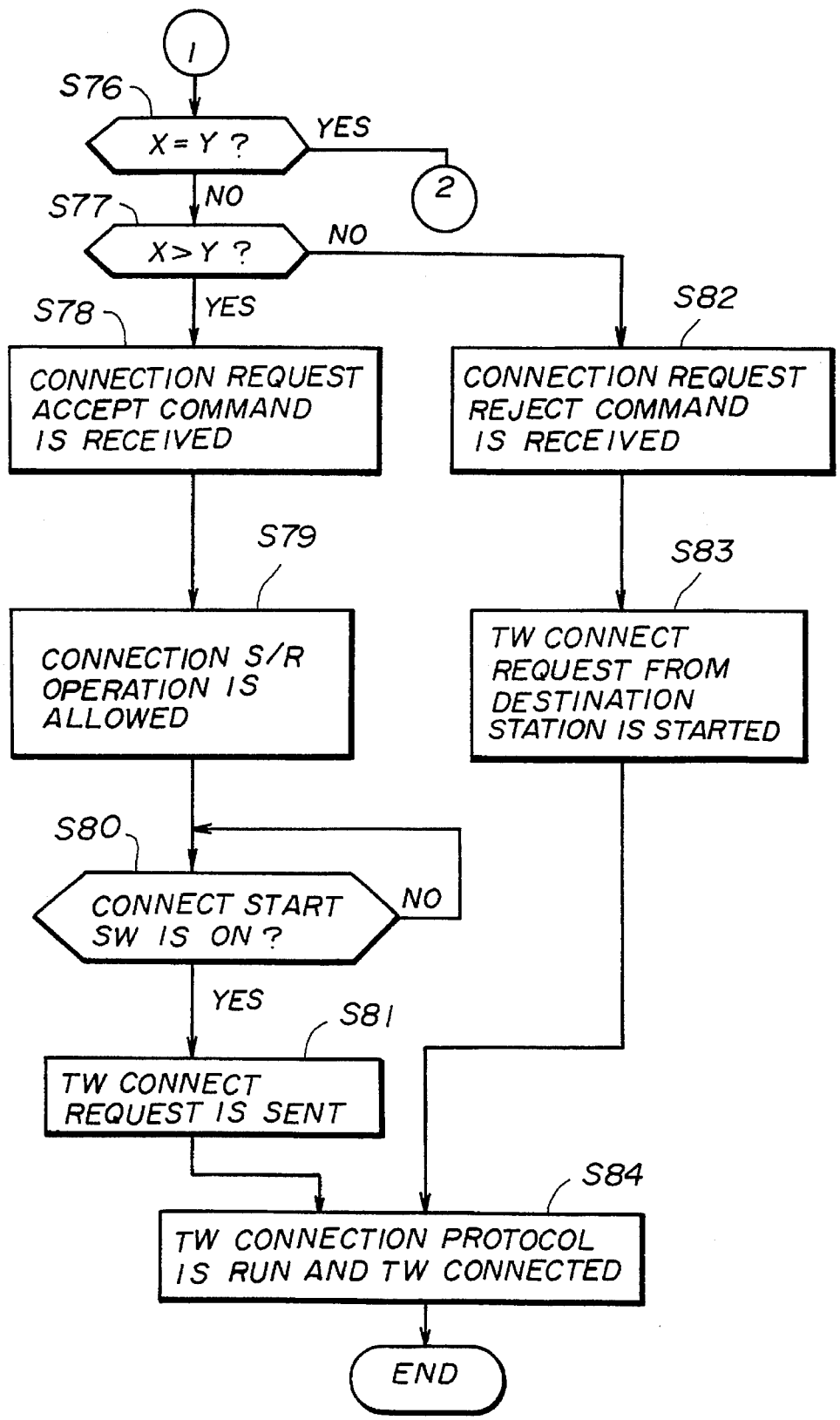

Next, a description will be given, with reference to FIGS.25A and 25B, of the operation of the communication system in the eighth embodiment. FIGS.25A and 25B show the connection establishment procedure of the eighth embodiment. Since steps S71 through S78 in FIGS.25A and 25B are the same as the above steps S1 through S8 in FIGS.19A and 19B, and since steps S81 through S84 in FIG.25B are the same as the above steps S9 through S12 in FIG.19B, a description thereof will be omitted.

In the connection establishment procedure in FIG.25B, step S77 detects whether or not the first random number "X", generated by the source terminal itself, is greater than the second random number "Y" received from the destination terminal.

If the result at step S7 is affirmative, the first random number "X" is detected to be greater than the second random number "Y". At step S78, the data link protocol running part of the source terminal transfers a connection request accept command to the application program thereof.

After the step S78 is performed, in the case of the eighth embodiment, the application program of the source terminal allows the connection start request operation to be manually done on the touch panel (LCD) of the drawing input unit 25 by using the touch pen, at step S79. At step S80, the application program of the source terminal detects whether the connection start switch of the button areas of the touch panel of the drawing input unit 25 is turned ON by the operator. When the result at step S80 is negative, the step S80 is repeated until the result is affirmative.

If the result at step S80 is affirmative, at step S81, the application program of the source terminal issues a connection request to the destination terminal, and allows the intermediate layer parts to run a connection protocol between the two stations.

On the other hand, if the result at step S77 is negative, it is detected that the first random number "X" is not greater than the second random number "Y". At this time, the destination terminal detects that the second random number "Y", generated by the destination terminal itself, is smaller than the first random number "X" received from the source terminal.

At step S82, the data link protocol running part of the destination terminal transfers a connection request reject command to the application program thereof. At step S83, the application program of the destination terminal awaits a connection request issued from the source terminal.

After either the above step S81 or the above step S83 is performed, the TW connection between the two terminals over the ISDN is established at step S84 without causing a connection error.

According to the eighth embodiment described above, if the communication system is set to the auto-start mode, the TW connection between the two telewriting terminals is automatically established without causing a connection error even when the ON state of each the two telewriting terminals is detected. In the eighth embodiment, only when the application program of the telewriting terminal has received the connection request accept command, the connection start request operation is allowed to be manually done on the touch panel (LCD) of the drawing input unit 25 by using the touch pen.

In the fourth and eighth embodiments described above, when the first random number "X", generated by the telewriting terminal itself, is detected to be greater than the second random number "Y" received from the other telewriting terminal, it is determined that the telewriting terminal is allowed to issue a connection start request to the other terminal. However, the present invention is not limited to these embodiments. Variations of the fourth and eighth embodiments in which the source terminal determination is made in the opposite manner are easily conceivable to those skilled in the art. That is, in such variations, when the first random number "X" is detected to be smaller than the second random number "Y" it is determined that the telewriting terminal is allowed to issue a connection start request to the other terminal.

Further, the present invention is not limited to the above described embodiments, and variations and modifications may be made without departing from the scope of the present invention.

What is claimed is:

1. A communication system for carrying out a teleconference between two multimedia stations over a network, said system comprising:

a source multimedia station;

a destination multimedia station;

first means, provided within said source multimedia station, for generating a first random number in response to a connection start request, for transmitting said first random number to said destination multimedia station, and for receiving a second random number from the destination multimedia station after said first random number is transmitted;

second means, provided within said destination multimedia station, for generating a second random number in response to a connection start request, for transmitting said second random number to said source multimedia station, and for receiving the first random number from said source multimedia station after said second random number is transmitted;

control means for establishing a telewriting connection between said two stations over a network by performing a telewriting connection protocol in response to a telewriting connection request issued from one of said two stations; and means for allowing said one of said two stations to issue a telewriting connection request to the other station, based on the result of comparison between said first random number and said second random number, and for inhibiting the other station from issuing a telewriting connection request, based on said result of said comparison.

2. A communication system according to claim 1, wherein a telewriting data signal is transmitted from one of said two stations to the other station through the established telewriting connection by using a multi-layer protocol signal or a low speed data signal in conformity with CCITT H.221.

3. A communication system according to claim 1, wherein the source multimedia station issues a telewriting connection request to the destination multimedia station after a connection start request response from the destination multimedia station is received.

4. A communication system for carrying out a video conference between two video conference stations over a network, said system comprising:

a source video conference station;

a destination video conference station;

first means, provided within said source video conference station, for generating a first random number in response to a connection start request, for transmitting said first random number to the destination video conference station, and for receiving a second random number from the destination video conference station;

second means, provided within said destination video conference station, for generating a second random number in response to a connection start request, for transmitting said second random number to the source video conference station, and for receiving the first random number from the source video conference station;

first control means for establishing a first connection between said two stations over a network by running a control and information connection protocol, in order for transmitting data in a full-duplex mode;

second control means for establishing a second connection between said two stations over the network by performing a telewriting connection protocol in response to a connection request issued from one of said two video conference stations after said first connection is established, in order for transmitting data in a half-duplex mode; and determination means for allowing said one of said two stations to issue a telewriting connection request to the other station, based on the result of comparison between said first random number and said second random number, and for inhibiting the other station from issuing a telewriting connection request, based on said result of said comparison.

5. A communication system according to claim 4, wherein a telewriting data signal is transmitted from one of said two stations to the other station through the established second connection by using a multi-layer protocol signal or a low speed data signal in conformity with CCITT H.221.

6. A communication system according to claim 4, wherein the source video conference station issues a telewriting connection request to the destination video conference station after a connection start request response from the destination video conference station is received.

7. A communication system according to claim 4, wherein a control and information signal is transmitted by using the first connection in order to establish a telewriting connection between the two stations, and wherein a telewriting data signal is transmitted by using the second connection in order to carry out video conference between the two stations.

8. A communication system for carrying out a teleconference between two telewriting terminals over a network, said system comprising:

a first telewriting terminal connected to a source teleconference station;

a second telewriting terminal connected to a destination teleconference station;

first data link protocol running means, provided within said first telewriting terminal, for generating a first random number in response to a connection start request, for transmitting said first random number to the second telewriting terminal, and for receiving a second random number from the second telewriting terminal;

second data link protocol running means, provided within said second telewriting terminal, for generating a second random number in response to a connection start request, for transmitting said second random number to the first telewriting terminal, and for receiving the first random number from the first telewriting terminal;

control means for establishing a telewriting connection between said two terminals over a network by performing a telewriting connection protocol in response to a telewriting connection request issued from one of said two terminals to the other terminal; and determination means for allowing said one of said two terminals to issue a telewriting connection request to the other terminal, based on the result of comparison between said first random number and said second random number, and for inhibiting the other terminal from issuing a telewriting connection request, based on said result of said comparison.

9. A communication system according to claim 8, wherein said control means automatically establishes a telewriting connection between said two terminals over the network when a power of at least one of said two terminals is detected to be on.

10. A communication system according to claim 8, wherein said control means establishes a telewriting connection between said two terminals over the network when a telewriting connection start operation is manually performed by an operator on at least one of said two terminals.

11. A communication system according to claim 8, further comprising switching means for setting the communication system to one of an auto-start mode and a manual-start mode in accordance with a selection of an operator.

12. A communication system according to claim 11, wherein, when the communication system is set to the auto-start mode by said switching means, said control means automatically establishes a telewriting connection between said two terminals over the network when a power of at least one of said two terminals is detected to be on.

13. A communication system according to claim 11, wherein, when the communication system is set to the manual-start mode by said switching means, said control means establishes a telewriting connection between said two terminals over the network when a connection start operation is manually performed by an operator on at least one of said two terminals.

14. A communication system according to claim 8, wherein the communication system is set to a manual-start mode when the control means does not receive a telewriting connection request command within a reference time during an auto-start mode.

15. A communication system according to claim 8, further comprising means for allowing an operator to perform a connection start request operation on a display area of a drawing input unit when the first random number, generated by the first data link protocol running means, is detected to be greater than the second random number received from the second data link protocol running means.

16. A communication system according to claim 8, further comprising means for inhibiting an operator from performing a connection start request operation on a display area of a drawing input unit when the first random number, generated by the first data link protocol running means, is detected to be smaller than the second random number received from the second data link protocol running means.

* * * * *